(12) United States Patent
Coffman et al.

(10) Patent No.: US 9,058,595 B2
(45) Date of Patent: Jun. 16, 2015

(54) METHODS AND SYSTEMS FOR MANAGING AN ELECTRONIC CALENDAR

(75) Inventors: Patrick L. Coffman, Menlo Park, CA (US); Gregory Christie, San Jose, CA (US); Manuel Colom, Paris (FR)

(73) Assignee: Apple Inc., Cupertino, CA (US)

(*) Notice: Subject to any disclaimer, the term of this patent is extended or adjusted under 35 U.S.C. 154(b) by 2296 days.

(21) Appl. No.: 11/499,406

(22) Filed: Aug. 4, 2006

(65) Prior Publication Data

US 2008/0033779 A1 Feb. 7, 2008

(51) Int. Cl.
*G06Q 10/00* (2012.01)
*G06Q 10/10* (2012.01)

(52) U.S. Cl.
CPC .......... *G06Q 10/109* (2013.01); *G06Q 10/1093* (2013.01)

(58) Field of Classification Search
USPC .......................... 705/7.11–7.42; 707/733–748
See application file for complete search history.

(56) References Cited

U.S. PATENT DOCUMENTS

| | | | | |
|---|---|---|---|---|
| 5,093,901 A | * | 3/1992 | Cree et al. | 715/753 |
| 5,247,438 A | * | 9/1993 | Subas et al. | 700/90 |
| 5,873,108 A | * | 2/1999 | Goyal et al. | 715/203 |
| 5,960,406 A | * | 9/1999 | Rasansky et al. | 705/7.18 |
| 6,101,480 A | * | 8/2000 | Conmy et al. | 705/7.18 |
| 6,363,352 B1 | * | 3/2002 | Dailey et al. | 705/7.19 |
| 6,369,840 B1 | * | 4/2002 | Barnett et al. | 715/853 |
| 6,480,830 B1 | * | 11/2002 | Ford et al. | 705/7.19 |
| 6,636,888 B1 | * | 10/2003 | Bookspan et al. | 709/203 |
| 6,728,530 B1 | * | 4/2004 | Heinonen et al. | 455/414.1 |
| 6,785,868 B1 | * | 8/2004 | Raff | 715/205 |
| 7,082,402 B2 | * | 7/2006 | Conmy et al. | 705/8 |
| 7,149,810 B1 | * | 12/2006 | Miller et al. | 709/246 |
| 7,185,290 B2 | * | 2/2007 | Cadiz et al. | 715/838 |
| 7,188,073 B1 | * | 3/2007 | Tam et al. | 705/9 |
| 7,349,920 B1 | * | 3/2008 | Feinberg et al. | 1/1 |
| 7,668,775 B2 | * | 2/2010 | Lu | 705/37 |
| 7,703,048 B2 | * | 4/2010 | Alford et al. | 715/747 |
| 7,721,229 B2 | * | 5/2010 | Frankel et al. | 715/835 |
| 7,757,181 B2 | * | 7/2010 | Pan et al. | 715/772 |
| 8,126,922 B2 | * | 2/2012 | Holzapfel et al. | 707/785 |
| 8,402,380 B2 | * | 3/2013 | Kikin-Gil et al. | 715/764 |
| 2002/0131565 A1 | * | 9/2002 | Scheuring et al. | 379/88.19 |
| 2003/0036941 A1 | * | 2/2003 | Leska et al. | 705/9 |
| 2004/0044646 A1 | * | 3/2004 | Hullot et al. | 707/1 |

(Continued)

OTHER PUBLICATIONS

"Microsoft® Office Outlook® 2003 Step by Step" Online Training Solutions,Inc., Microsoft Press, Aug. 27, 2003 ISBN-10: 0-7356-1521-7.*

(Continued)

*Primary Examiner* — Alan S Miller
(74) *Attorney, Agent, or Firm* — Schwegman Lundberg & Woessner, P.A.

(57) ABSTRACT

Methods and systems for managing an electronic calendar are described. One exemplary method includes displaying a calendar on a display device, the calendar having at least one time range, and displaying an invitation, before it is accepted, on the calendar in the at least one time range with other events which are already accepted. Another exemplary method includes displaying a calendar on a display device and displaying a list of user-selectable calendars comprising an invitation calendar which presents invitations which have not yet been accepted or declined on the invitation calendar. Other methods are described, and machine readable media and systems are also described.

51 Claims, 19 Drawing Sheets

(56) References Cited

U.S. PATENT DOCUMENTS

| | | | | |
|---|---|---|---|---|
| 2004/0044920 | A1* | 3/2004 | Hullot et al. | 713/400 |
| 2004/0088362 | A1* | 5/2004 | Curbow et al. | 709/207 |
| 2004/0109025 | A1* | 6/2004 | Hullot et al. | 345/764 |
| 2004/0268270 | A1* | 12/2004 | Hill et al. | 715/963 |
| 2005/0039142 | A1* | 2/2005 | Jalon et al. | 715/823 |
| 2005/0057584 | A1* | 3/2005 | Gruen et al. | 345/752 |
| 2005/0177404 | A1* | 8/2005 | Hyttinen | 705/7 |
| 2005/0222971 | A1* | 10/2005 | Cary | 707/1 |
| 2006/0129602 | A1* | 6/2006 | Witriol et al. | 707/104.1 |
| 2006/0190313 | A1* | 8/2006 | Lu | 705/8 |
| 2006/0248109 | A1* | 11/2006 | Racovolis | 707/102 |
| 2006/0265660 | A1* | 11/2006 | Hullot et al. | 715/733 |
| 2007/0260503 | A1* | 11/2007 | Pan et al. | 705/9 |
| 2008/0115088 | A1* | 5/2008 | Frankel et al. | 715/835 |
| 2008/0178110 | A1* | 7/2008 | Hill et al. | 715/771 |
| 2008/0250334 | A1* | 10/2008 | Price | 715/753 |
| 2013/0097530 | A1* | 4/2013 | Lu | 715/753 |

OTHER PUBLICATIONS

"Microsoft® Office Outlook® 2003 Inside Out" Jim Boyce; Microsoft Press, Nov. 5, 2003, ISBN-10: 0-7356-1514-4.*

"Outlook Answer Book, The: Useful Tips, Tricks, and Hacks for Microsoft Outlook® 2003" Tom Archer; Brian Delahunty, Addison-Wesley Professional, Aug. 30, 2005, ISBN-10: 0-321-30397-0.*

Screen shots from http://office.microsoft.com/en-us/outlook/HP030759191033.aspx and http://office.microsoft.com/en-us/outlook/HA011276781033.aspx, relating to Microsoft Outlook 2003, released Oct. 21, 2003.*

MacKinlay, Jock D. et al. "Developing Calendar Visualizers for the Information Visualizer," ACM, UIST '94, Nov. 2-4, 1994, pp. 109-118.*

Silva, Sonia Fernandes et al. "Visualization of Linear Time-Oriented Data: a Survey," IEEE 2000, pp. 310-319.*

Carlis, John V. et al. "Interactive Visualization of Serial Periodic Data," Proceedings of the 11th annual ACM Symposium on User Interface Software and Technology (UIST '98), San Francisco, Nov. 1998, pp. 1-10.*

Jonsson, Martin et al. "Achieving Non-Intrusive Environments for Local Collaboration," The FUSE Research Group, Center for Wireless Systems, Kista, Sweden (2000),14 pages.*

Tullio, Joe et al. "Augmenting Shared Personal Calendars," Proceedings of the 15th annual ACM Symposium on User Interface Software and Technology (UIST '02), Paris, France, 4(2):11-20, Oct. 27-30, 2002, 10 pages.*

* cited by examiner

METHODS AND SYSTEMS FOR MANAGING AN ELECTRONIC CALENDAR

BACKGROUND OF THE INVENTION

The present inventions relate to methods and systems for managing an electronic calendar.

An electronic calendar is typically implemented on a data processing system, such as a general purpose computer system or a personal digital assistant (PDA) or a cellular telephone or a media player (e.g. an iPod) or other types of devices. These electronic calendars typically allow a user to display different time intervals or time ranges within a calendar. For example, an electronic calendar will typically allow a user to display at least a portion of a day, a full day, a portion of a week or a full week, several weeks, or a month, or a plurality of months, or even multiple years. The electronic calendars further typically include user interfaces for allowing a user to move between the different time durations or time ranges and to enter events and reminders onto the calendar. The events and/or reminders typically include some text specifying the event as well as data specifying the duration in time of the event and other information. A user can typically save these reminders or events at a particular time on the calendar and then later retrieve the information from the calendar to see what events are upcoming, to plan for events, etc.

Oftentimes, an event may require several people to attend the event, such as a meeting or a party, etc. In these circumstances, the creator of the event on the calendar will typically send out an invitation to those being invited to or requested to attend the event. Prior data processing systems allow a user to create an event on a calendar and then cause an electronic message to be sent out to those being invited or requested to attend the event. The message may be sent by an electronic message, such as email, or some other type of notification about the event. These invitations are received by attendees or others required to attend in an email form which does not display the invitation in a calendar or in the context of a calendar with other events listed on the calendar which have already been accepted. Hence, a user cannot see the date and time of the invitation in the context of other events already on the user's calendar. Moreover, prior systems and methods do not include a calendar which is devoted to showing invitations which have not yet been accepted.

SUMMARY OF THE DESCRIPTION

Methods and systems for managing electronic calendars are described herein. One exemplary method for managing an electronic calendar includes displaying a calendar on a display device, the calendar having at least one time range, and displaying an invitation, before it is accepted, on the calendar in the at least one time range. Typically, the invitation relates to an event having a time in a time duration, and the invitation is displayed at that time on the user's calendar with an indication of the time duration on the user's calendar. In certain embodiments, the method may further include receiving a user input to display the invitation before it is accepted on the calendar along with other events, which are already accepted, on the user's calendar. In addition, the method may further include receiving a notification of the invitation before it is displayed on the calendar, and displaying a user interface to allow a user to accept or decline the invitation. In certain embodiments, the user interface may comprise an accept icon or a decline icon or both displayed on the invitation itself on the user's calendar. In certain implementations, the method may also include displaying a list of user-selectable calendars which include an invitation calendar which presents invitations which have not been accepted or declined and wherein accepting the invitation causes the invitation to be removed from the invitation calendar and causes the invitation to be displayed on the user's calendar in a form to show it has been accepted. In at least certain embodiments of one or more of these methods, the invitation, as it is displayed on the user's calendar before it is accepted, is displayed in a manner to differentiate itself from other events which have already been accepted. For example, the invitation may appear with a coupon-like perimeter or frame and may be shown in a color which is different than the color of other events which have already been accepted in the user's calendar.

Another aspect of the present inventions relates to the use of an invitation calendar which may be part of a user-selectable list of calendars. One exemplary method which uses an invitation calendar includes displaying a calendar on a display device, the calendar having at least one time range, and displaying a list of user-selectable calendars including an invitation calendar which presents invitations which have not yet been accepted on the invitation calendar. This method may also display, for each user-selectable calendar in the list, a user interface to cause events from a corresponding calendar to be displayed or not displayed on the calendar. In this example, when the user interface for the invitation calendar is set to cause invitations from the invitation calendar to be displayed, then invitations are displayed on the user's calendar before an invitation is accepted, and when the user interface for the invitation calendar is set to cause invitations from the invitation calendar to be not displayed, then the invitations are not displayed. This method may further include receiving a notification of an invitation and displaying an alert or other information with respect to the invitation, and the method may further include displaying a user interface to allow a user to accept the invitation. The invitations, when displayed on the calendar before being accepted, may be visually distinguishable from other events from other calendars in the list of user-selectable calendars.

One or more methods described herein by be performed by a data processing system, such as a general purpose computer system, a PDA, a cellular telephone, a media player, etc. These devices may use one or more computer programs to perform these methods and they may include machine readable media containing those computer programs.

The methods and/or computer programs of any one of these embodiments may be compliant with standards for calendaring applications, such as iCal and vCal, and may allow for the importation of data from other applications such as Entourage, or other calendaring programs.

In addition, in at least certain embodiments, the methods or systems described herein may enable copy and paste operations with other applications, and may enable drag and drop manipulations or the use of a spell checker, or the integration with email applications and address book applications for management of personal information. Furthermore, in at least certain embodiments, the methods and systems described herein may also permit users to publish their calendars to others (e.g. publish their calendar through the use of the Internet) and may also allow a user to subscribe to other calendars, thereby coordinating or managing events of one user with those of another.

BRIEF DESCRIPTION OF THE DRAWINGS

The present invention is illustrated by way of example and not limitation in the figures of the accompanying drawings in which like references indicate similar elements.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2006.

Figure 1:
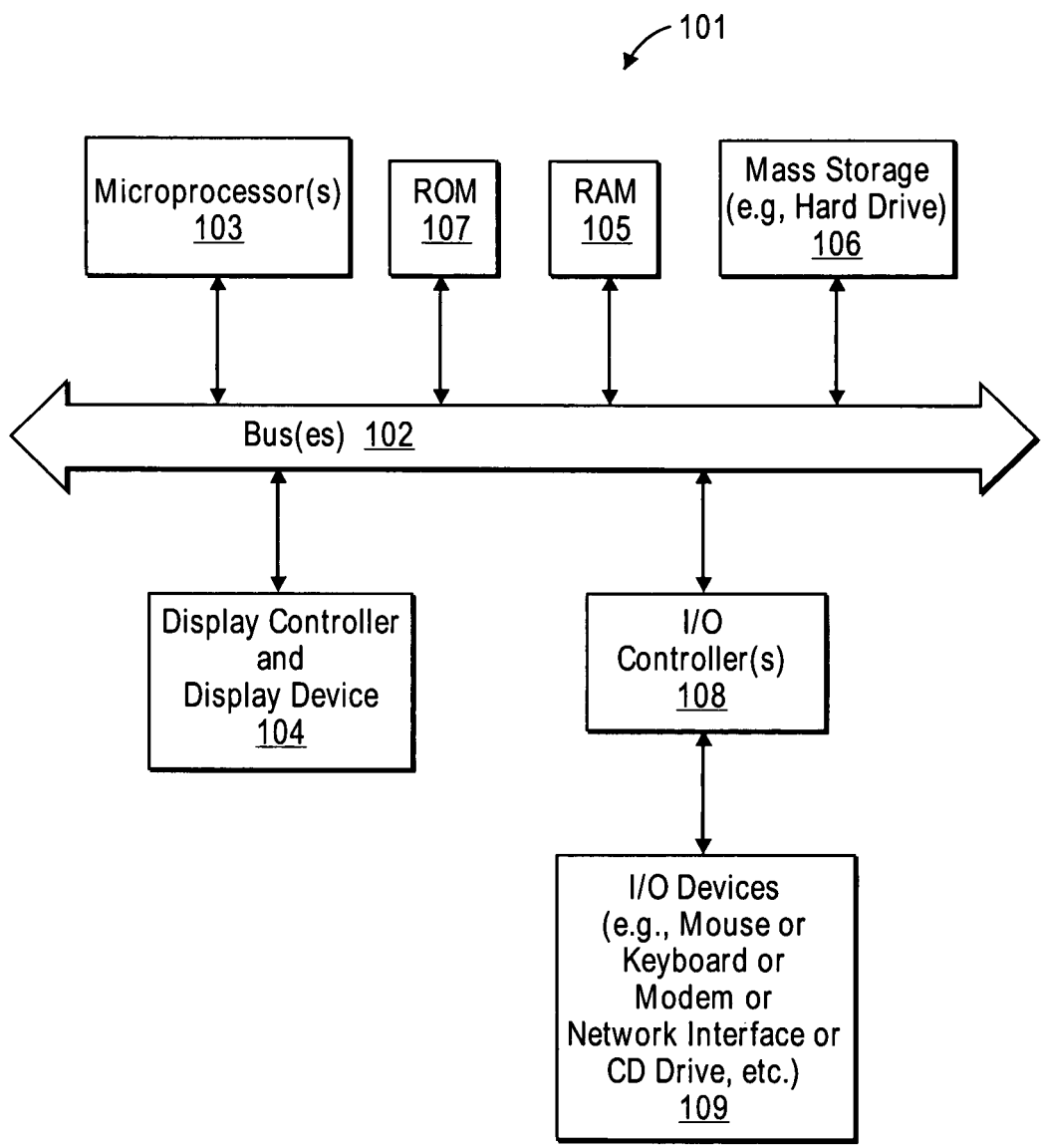
FIG. 1 shows an exemplary data processing system which may be used in at least certain embodiments described herein.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that PDAs, cellular telephones, media players (e.g. an iPod), devices which combine aspects or functions of these devices (e.g. a media player combined with a PDA and a cellular telephone in one device), network computers, an embedded processing device within another device, and other data processing systems which have fewer components or perhaps more components may also be used to implement one or more embodiments of the present inventions. The computer system of FIG. 1 may, for example, be a Macintosh computer from Apple Computer, Inc.

As shown in FIG. 1, the computer system 101, which is a form of a data processing system, includes a bus 102 which is coupled to a microprocessor(s) 103 and a ROM (Read Only Memory) 107 and volatile RAM 105 and a non-volatile memory 106. The microprocessor 103 may be a microprocessor or set of microprocessors from Intel or a G3 or G4 microprocessor from Motorola, Inc. or one or more G5 microprocessors from IBM. The bus 102 interconnects these various components together and also interconnects these components 103, 107, 105, and 106 to a display controller and display device 104 and to peripheral devices such as input/output (I/O) devices which may be mice, keyboards, modems, network interfaces, printers and other devices which are well known in the art. Typically, the input/output devices 109 are coupled to the system through input/output controllers 108. The volatile RAM (Random Access Memory) 105 is typically implemented as dynamic RAM (DRAM) which requires power continually in order to refresh or maintain the data in the memory. The mass storage 106 is typically a magnetic hard drive or a magnetic optical drive or an optical drive or a DVD RAM or other types of memory systems which maintain data (e.g. large amounts of data) even after power is removed from the system. Typically, the mass storage 106 will also be a random access memory although this is not required. While FIG. 1 shows that the mass storage 106 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 108 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, RAM 105, mass storage 106 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

One example of a computer program which may implement one or more methods described herein is the computer program called iCal from Apple Computer, Inc. of Cupertino, Calif. Further information about this computer program is also provided by published U.S. Patent Application No. US2004/0044646, which published application is hereby incorporated herein by reference.

Figure 2:
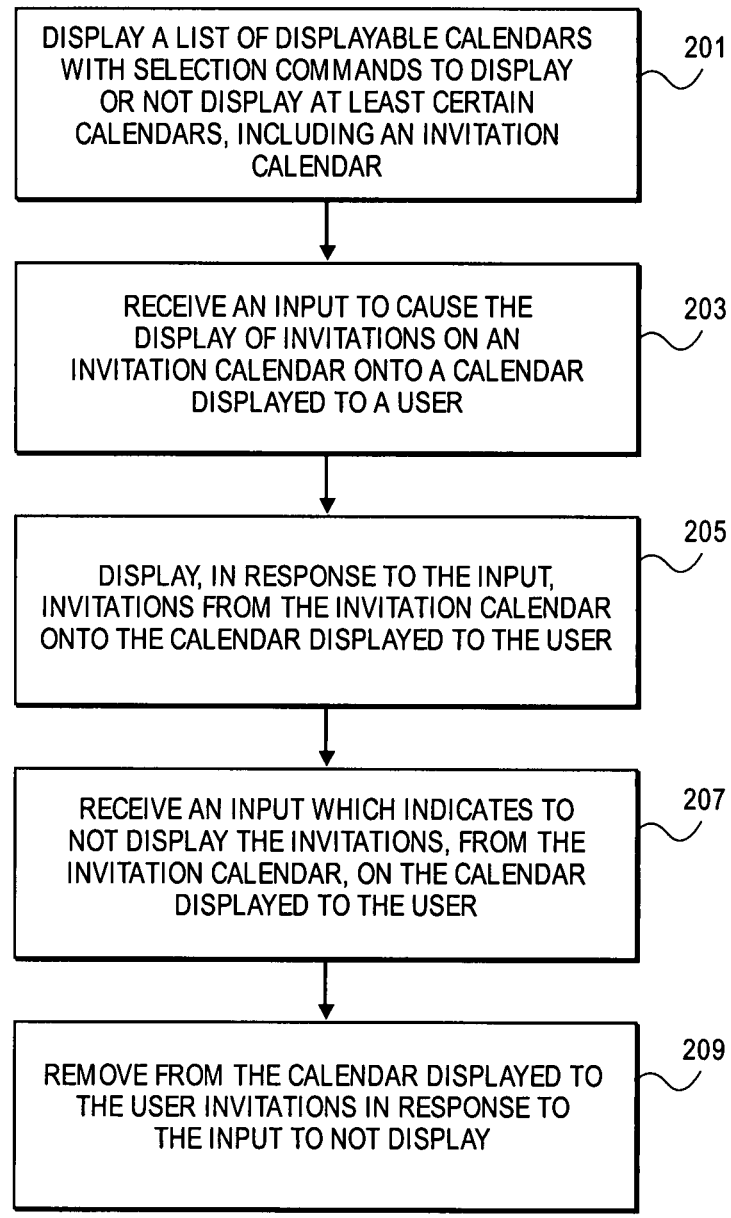
FIG. 2 is a flow chart which depicts an exemplary embodiment described herein.
Figure 3A:
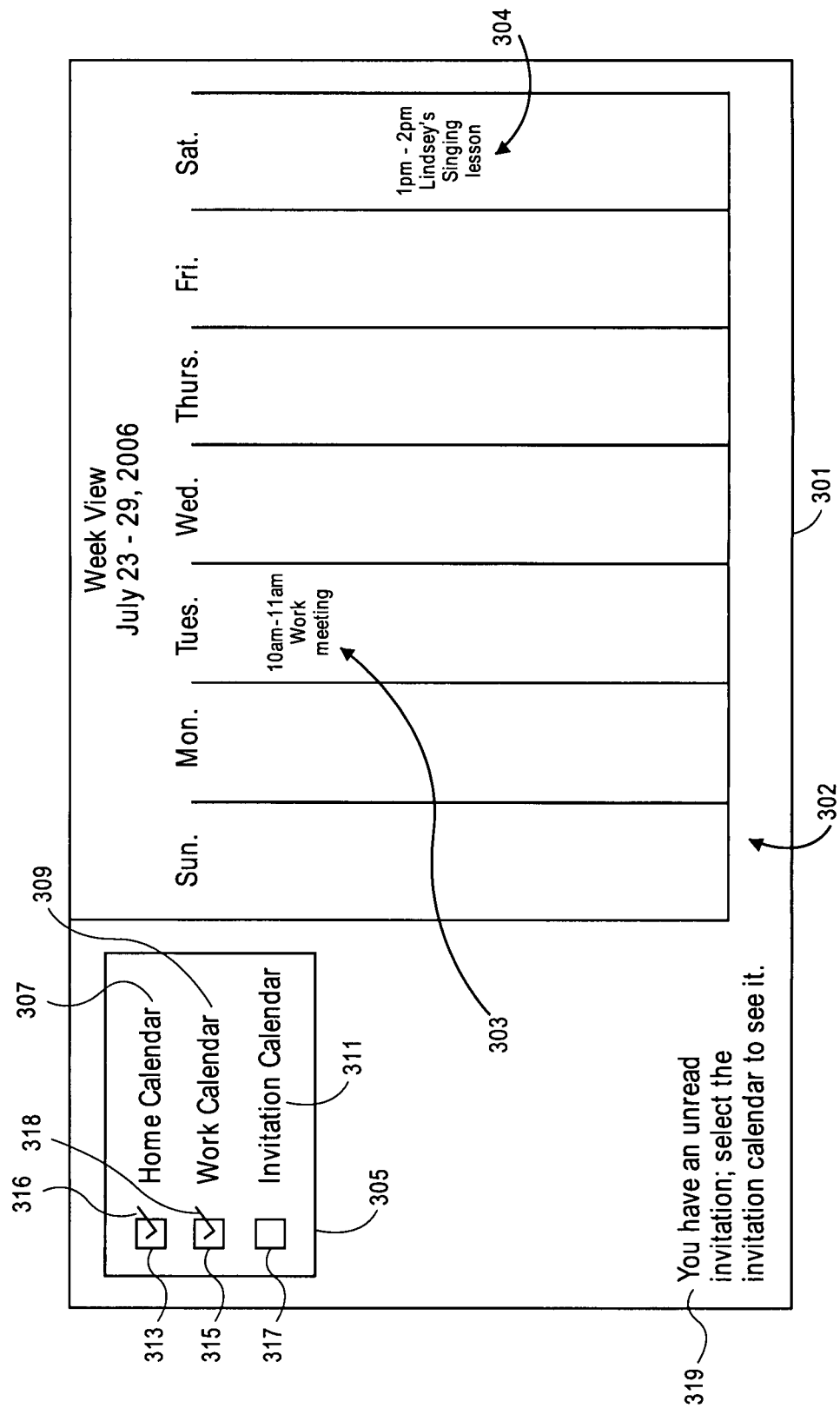
FIGS. 3A, 3B, 3C, 3D, and 3E show examples of a user interface which includes a list of selectable calendars.

FIG. 2 shows a flow chart illustrating one or more exemplary embodiments of methods of the present inventions. The method of FIG. 2 begins in operation 201 in which a list of displayable calendars with selection commands is displayed. This list may be displayed within a calendar window and the selection commands may be displayed adjacent to each corresponding calendar which the command controls. Each command is selectable by a user to display or not display events from a particular calendar, thereby causing events to appear or not appear within the time range, such as a week view of a user's calendar. FIG. 3A shows an example of a user interface for a calendar application. The calendar application causes the display of a calendar window 301 which includes a view 302 of a user's calendar. In the example of FIG. 3A, the view is a week view, but it will be appreciated that alternative views may show a day view or a month view or other types of views. The view 302 shows an event 303 from the user's work calendar 309 shown in the list of displayable calendars 305. The view 302 also shows an event 304 from the user's home calendar 307, also shown in the list of selectable calendars 305. The list 305 also includes an invitation calendar 311. Each of the three calendars shown in the list 305 includes a respective selection command. In particular, the home calendar 307 includes a selection command 313, and the work calendar 309 includes a selection command 315, and the invitation calendar 311 includes a selection command 317. Each of these selection commands may be independently selected or not selected by the user, thereby causing events from the corresponding calendar to appear or not appear within the view 302 of the user's calendar. In the example shown in FIG. 3A, the user (or alternatively, software under default or other setting), has selected for display events from both the home calendar 307 and events from the work calendar 309 and thus check marks 316 and 318 appear within the corresponding selection commands 313 and 315. The selection commands may be activated in a variety of ways, including cursor inputs or keyboard inputs or speech inputs to the data processing system. For example, a user may position a cursor, as controlled by a mouse or other cursor control device, over the corresponding selection command and thereafter pressing a button, such as a mouse's button, to select the command or deselect the command. Also as shown in FIG. 3A, the invitation calendar has not been selected and thus there is no check mark in the selection command 317; hence, invitations from the invitation calendar which have not been accepted will not be displayed in the view 302. A notification 319 is also displayed within the window 301. This notification indicates that there is an unread invitation and tells the user to select the invitation calendar to see the unread invitation.

Figure 3B:
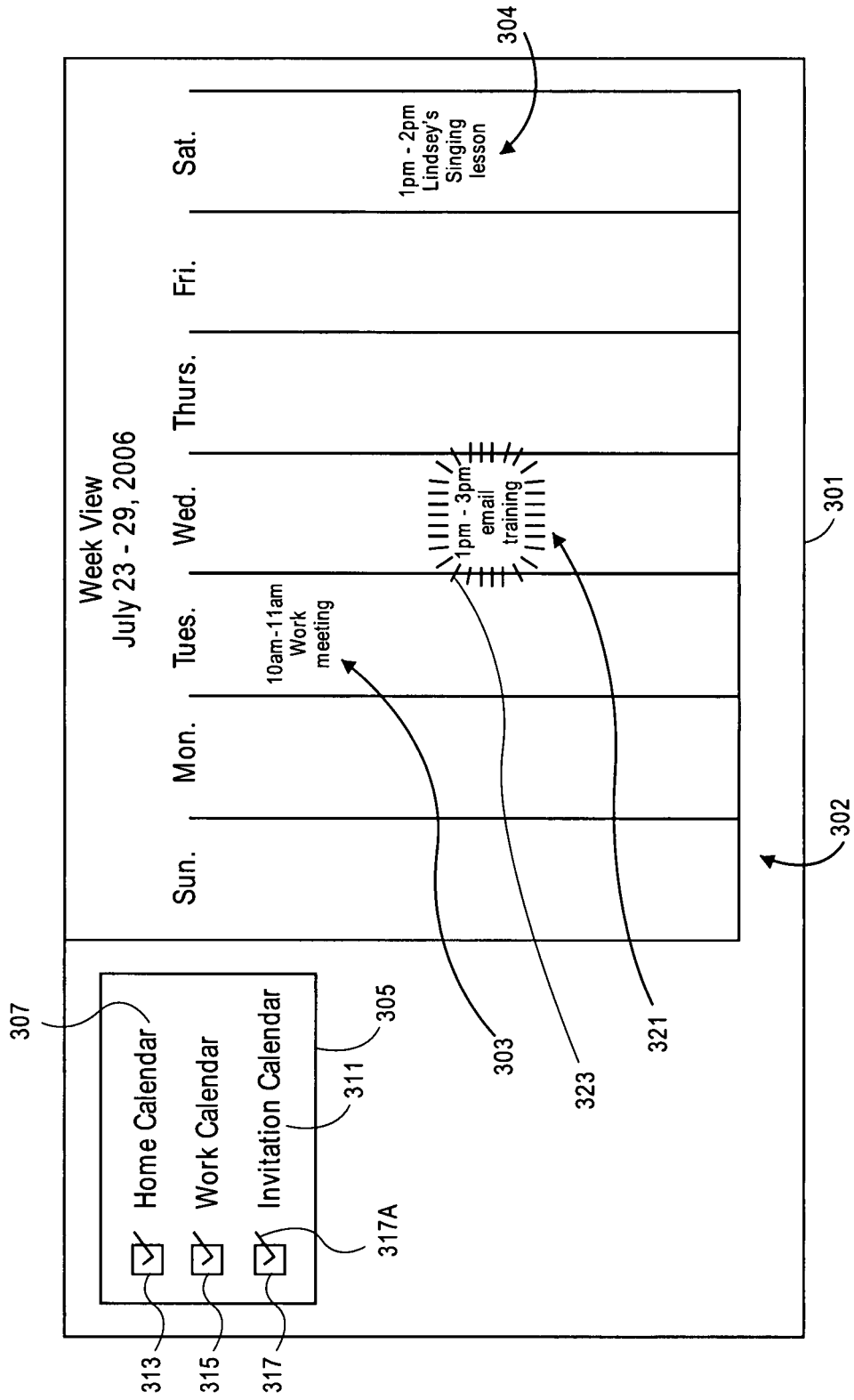
Figure 3C:
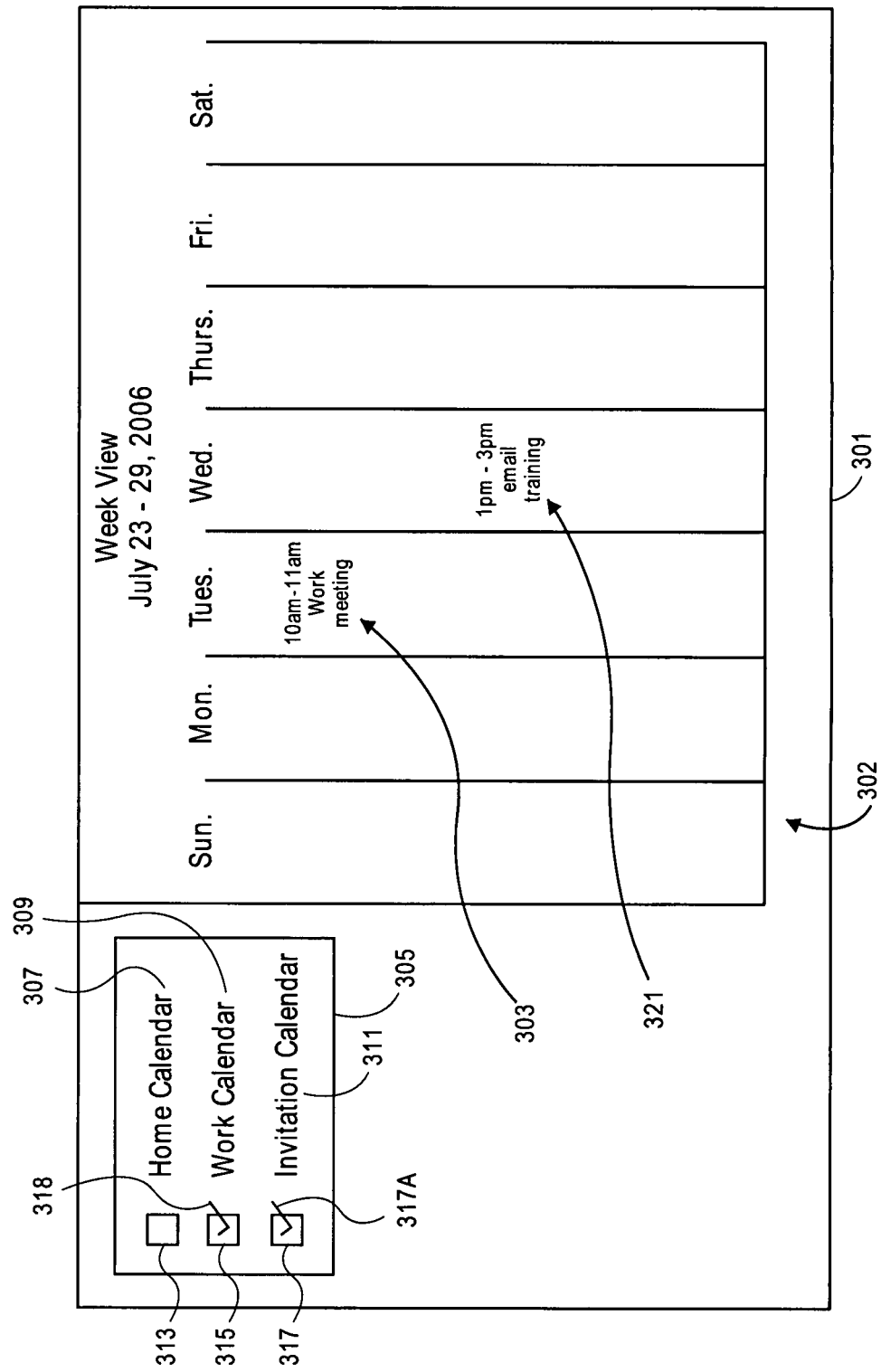
Figure 3D:
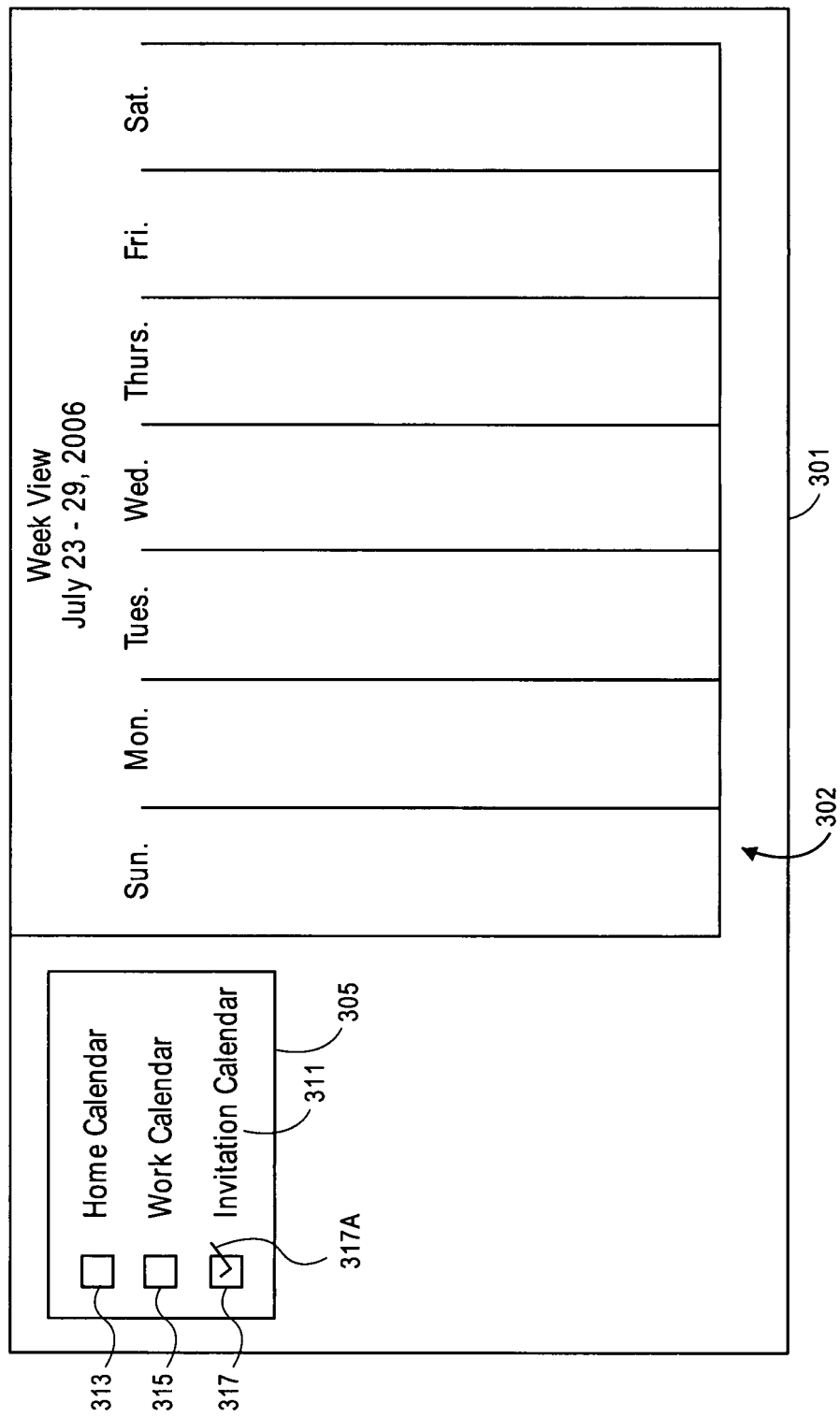
Figure 3E:
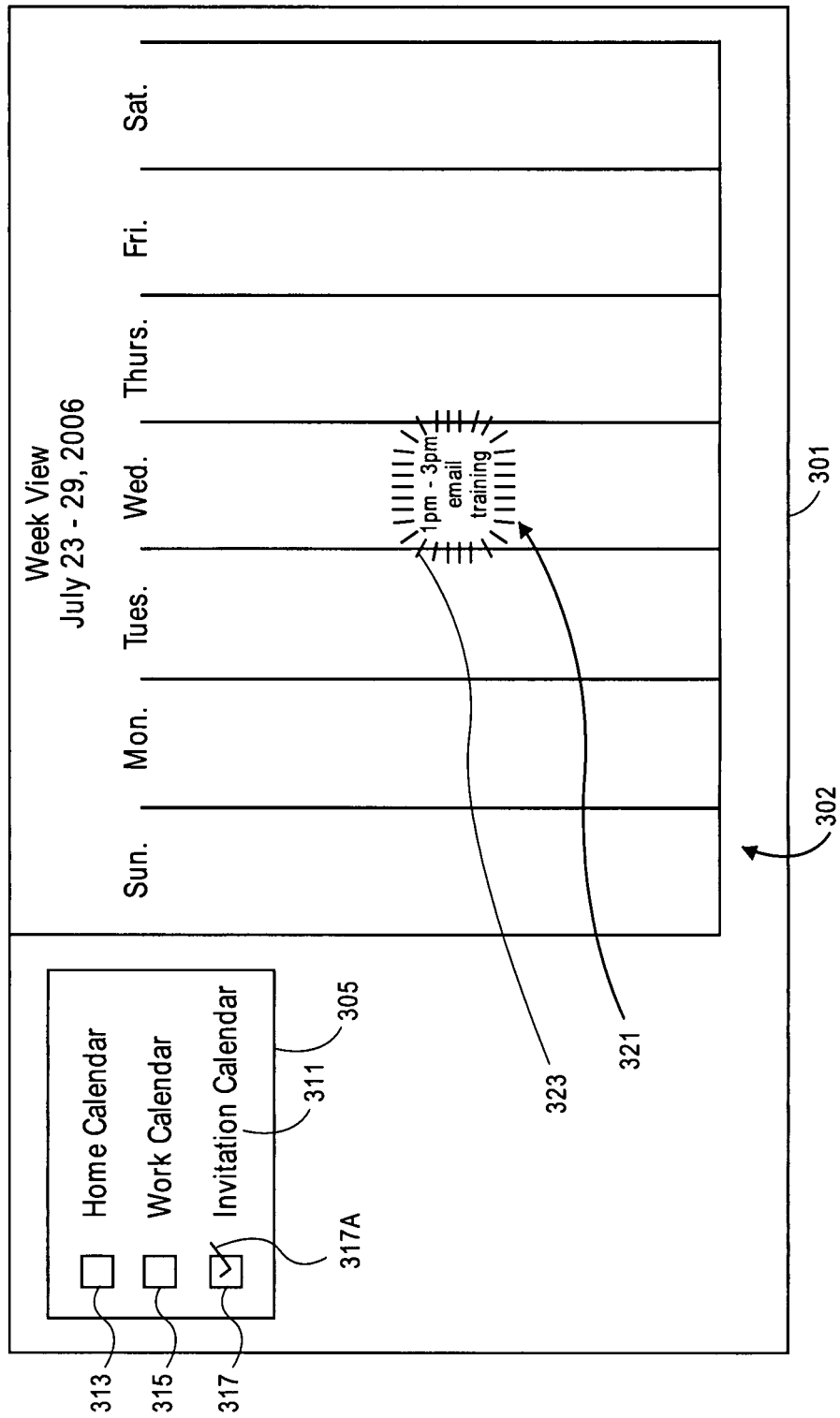
Figure 3F:
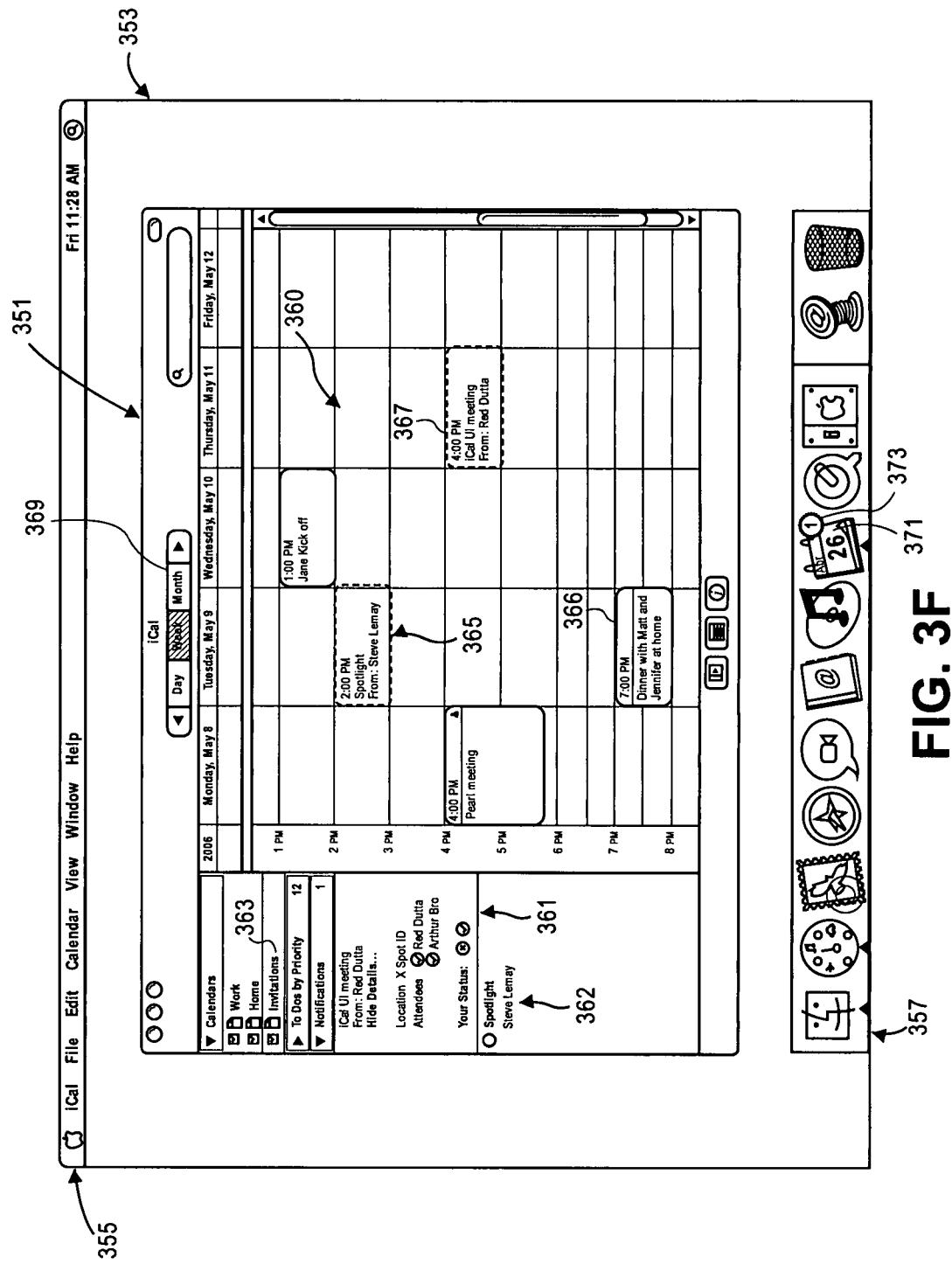
FIG. 3F shows another example of a user interface which includes a plurality of user-selectable calendars in a list, each of which may be toggled on or off and thereby shown or not shown on the user's calendar within the calendar window.

In response to the notification, the user may select the selection command 317 to cause invitations from the invitation calendar 311 to appear in the view 302. Alternatively, in response to an invitation, the system may automatically cause the selection of the selection command 317 to thereby cause unaccepted invitations to appear in the view 302 in the user's calendar. Referring back to FIG. 2, operation 203 involves receiving an input to cause the display of invitations from an invitation calendar onto a calendar displayed to a user. In response, in operation 205, invitations from the invitation calendar are displayed on a view of the user's calendar on a display device. FIG. 3B shows an example of such a view in which an unaccepted invitation from the invitation calendar is displayed in the view 302. A check mark 317A shows that the user has, or the system has, caused an input, which was received in operation 203, to thereby cause invitations to appear in the view 302. As shown in FIG. 3B, the home calendar and the work calendar have also been selected in the list 305 and hence events from both of those calendars are also displayed in the view 302 as shown in FIG. 3B. In particular, event 303 from the work calendar, event 304 from the home calendar, and the invitation 321 from the invitation calendar 311 are all concurrently displayed in the view 302. Events 303 and 304 are displayed in a fashion showing that they have been accepted, while the invitation 321 is displayed in a manner to show that it has not yet been accepted or declined. This is shown by the visual indicator 323. There are numerous alternative ways to show that the invitation 321 has not yet been accepted or declined in the view 302. For example, the unaccepted invitation may flash or be displayed with a coupon-like perimeter or displayed with text indicating it is not yet accepted, or displayed with "accept" and "reject" icons adjacent to the invitation on the view 302, etc. FIG. 3F shows a particular embodiment in which the invitations 365 and 367, which have not yet been accepted, are displayed in a view of a calendar while other events which have been accepted, such as event 366, is displayed differently. FIG. 6B shows an example in which an invitation which has not yet been accepted, such as invitation 609A, includes "accept" and "decline" icons which may also be used to differentiate an unaccepted invitation from other events which have been accepted. A user may decide, while viewing the user interface shown in FIG. 3B, to view only invitations from the invitation calendar, and this result is shown in FIG. 3E in which only the invitation calendar has been selected through the selection command 317, while the other selection commands 313 and 315 have been deselected, such that events from the home calendar and the work calendar do not appear in the view 302 shown in FIG. 3E. Hence, the list of selectable calendars 305 allows a user to toggle calendars on or off independently to focus on a particular calendar, although it will be appreciated that the user interface shown in FIG. 3B gives the user the ability to see the invitation which has not yet been accepted relative to other events in additional calendars beyond the invitation calendar. It will be understood that there may be a plurality of invitations which have not yet been accepted which are shown on the invitation calendar, and an example of this is shown in FIG. 3F which includes two unaccepted invitations 365 and 367 along with other events from selected calendars as shown in FIG. 3F. It will be appreciated that a user may remove the invitations from view 302 shown in FIG. 3B by deselecting the invitation calendar 311 in the list 305, and this will return the view to the state it was in FIG. 3A. This is also shown as operations 207 and 209 of FIG. 2.

The user may accept or decline an invitation by using one of a variety of different user interfaces as further described herein. FIGS. 3C and 3D show an example of the user interface of one embodiment after an invitation has been accepted. It can be seen from FIG. 3C that the view 302 now includes the event 321 which is an accepted invitation, and it is displayed as other events are also displayed which have been accepted. Thus, the appearance of the event 321 is similar to the appearance of the event 303. Also note that events from only the work calendar are now shown in the view 302, while events from the home calendar are not shown (and hence the event 304 is not shown in the view 302 of FIG. 3C). FIG. 3D shows the invitation calendar 311 only in the view 302. There are no invitations shown in the view 302 of FIG. 3D because the invitation related to event 321 has been accepted and hence it has been removed from the invitation calendar as shown in the view 302 of FIG. 3D. In certain embodiments, the invitation calendar shows only invitations, such as invitations which have not yet been accepted.

FIG. 3F shows one example of a user interface according to one embodiment of the present inventions. This user interface includes a calendar window 351 shown on a desktop 353. A dock 357 is also shown on the desktop 353. The dock includes an icon 371 representing the calendar application which is running and causing the display of the calendar window 351. The dock also includes a notification icon 373 which indicates that the system has received one notification relating to an invitation. The user interface also includes a pull-down menu region 355. The calendar program window 351 includes a user interface 369 for selecting a time range, such as a week or day or month range for display of events within the view 360 of the user's calendar. As shown in FIG. 3F, the week range has been selected from the user interface 369, causing a week view to appear in the view 360. Numerous events from three different calendars (a work calendar, a home calendar, and an invitations calendar) are shown within the view 360. For example, event 366 from the home calendar is shown with several events from the work calendar. In addition, two invitations 365 and 367 are also shown in the view 360 concurrently with the other events from the other calendars. As with the example shown in FIG. 3A, the calendars may be selectively turned on or off, thereby displaying or not displaying events from a selected calendar. As can be seen from FIG. 3F, the invitations calendar 363 has been selected for display, causing the invitations 365 and 367 to appear without a particular color which is related to the other calendars and to appear with a coupon-like perimeter, indicating to the user that these events are invitations which have not yet been accepted. A notifications portion of the calendar program window 351 shows two notifications 361 and 362. The notification 361 has been expanded to show details about this particular notification which relates to the invitation 367 shown in a particular time on Thursday, May 11. Note that the invitations are shown at the particular time of the invitation on the view 360 and that the duration of the invitation is also shown by the area that the invitation spans on the view 360. This is similar to how the area of the events which have been accepted, such as event 366, also indicates the duration of the event. The notification 361 includes an "accept" icon and a "decline" icon for accepting or declining the invitation 367. In an alternative embodiment, these icons may be shown only when the invitation 367 is within the view 360 or in addition to the invitation 367 on the view 360.

Figure 4A:
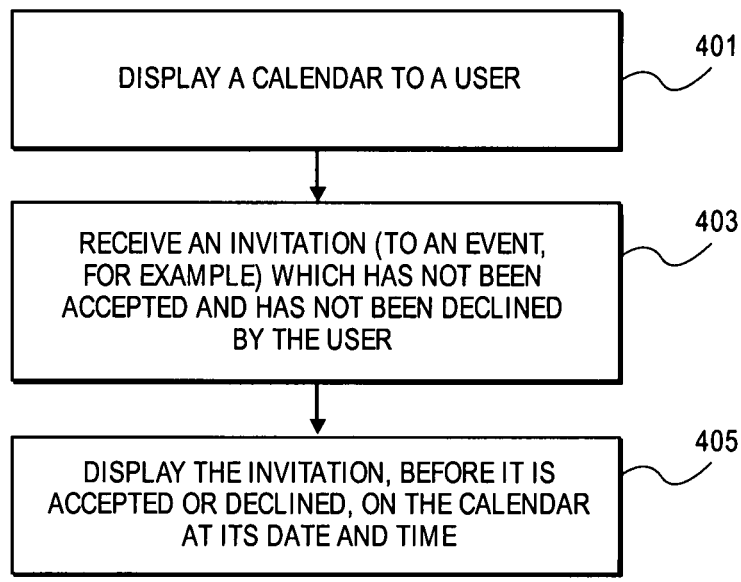
FIG. 4A shows a flow chart illustrating another exemplary method described herein.

FIG. 4A is a flow chart indicating an exemplary method according to one aspect of the present inventions. In operation 401, a calendar is displayed to a user. Then in operation 403, an invitation to an event which has not yet been accepted and which has not yet been declined, is received. This invitation is displayed, in operation 405, before it is accepted or declined. It is displayed, in operation 405, on the calendar at its date and time and may include an indication of the duration of the event related to the invitation. Examples of user interfaces related to this method of FIG. 4A have been provided above, including, for example, the user interface in FIG. 3B and the user interface shown in FIG. 3F in which invitations are displayed before they are accepted or declined on the user's calendar at the date and time of the invitation.

Figure 4B:
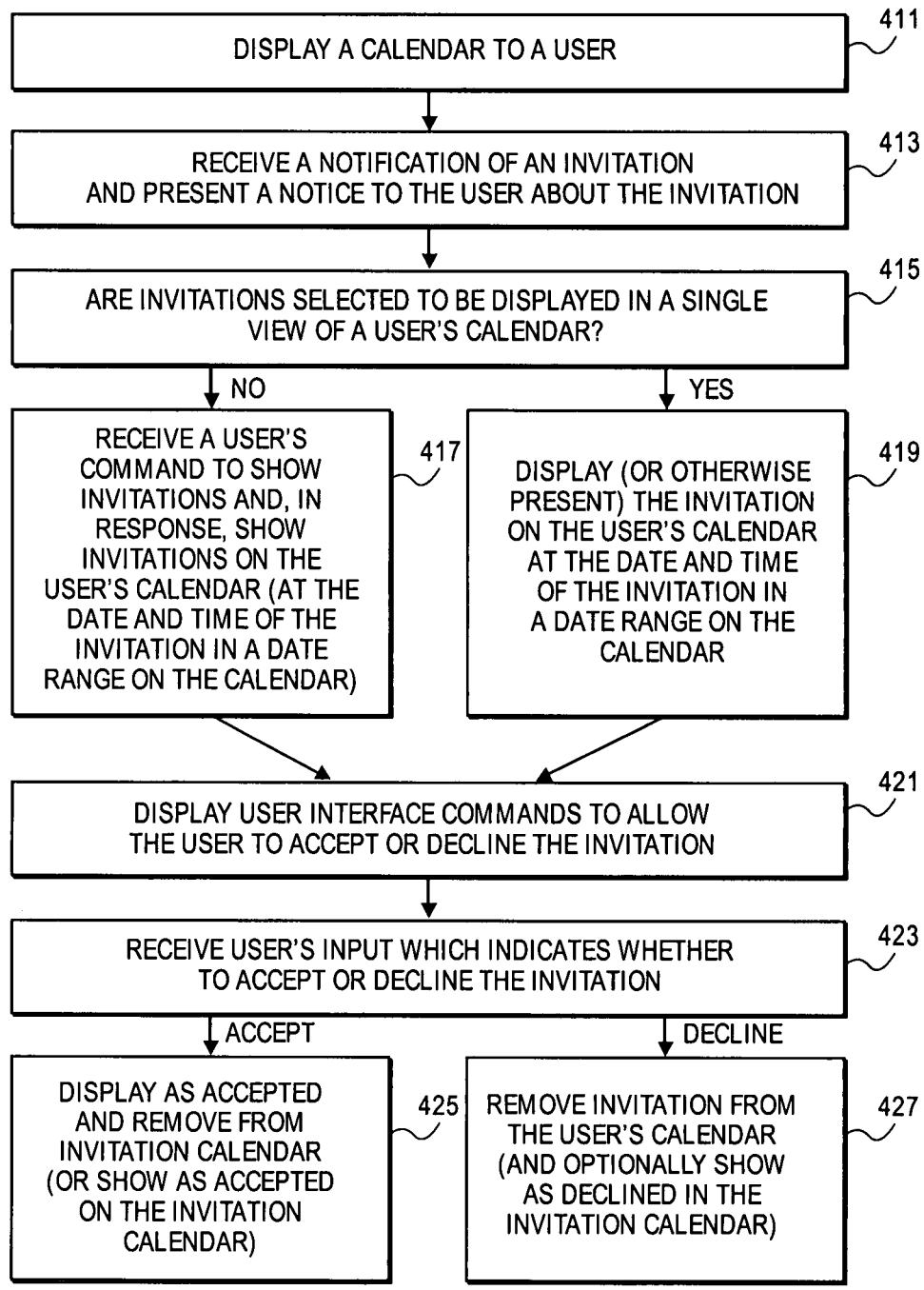
FIG. 4B is another flow chart showing another exemplary embodiment of the methods described herein.

FIG. 4B shows a more detailed method than the method of FIG. 4A, and this more detailed method is yet another exemplary embodiment according to at least one aspect of the present inventions. Examples of user interfaces which illustrate at least portions of this method have been provided herein, including, for example, FIGS. 3A, 3B, 3F, and other figures. In operation 411, the data processing system displays a calendar to a user. In operation 413, a notification of an invitation is received, and the data processing system presents a notice to the user about the invitation. It will be appreciated that in certain embodiments, the sequence of operations 413 and 411 may be reversed. For example, the calendar may be displayed in operation 411 after receiving the notification 413, and this may occur automatically in response to the notification. It will be also appreciated that various other sequences for other operations in the methods shown in FIG. 4B may be utilized by at least certain embodiments of the present inventions. In operation 415, it is determined whether or not invitations have been selected to be displayed in a view of a user's calendar. In one embodiment, this may involve determining whether or not a selection command, such as selection command 317, has been selected, either by the user or by the system. If it has not been selected, then operation 417 follows, and if it has been selected, then operation 419 follows as shown in FIG. 4B. In operation 417, the data processing system receives a user's command (or a system input or a programmatic input) to show the invitations, and in response, the invitations are shown on the user's calendar at the date and time of the invitation in a selected date range on the calendar. If the invitations had been selected, as determined in operation 415, then operation 419 follows in which the invitation is displayed or otherwise presented on the user's calendar. In operation 421, user interface commands are displayed to allow the user to accept or decline the invitation. The user's input (or input from the system or a software program) is received in operation 423, which input indicates whether or not to accept or decline the invitation. If the invitation is accepted, then operation 425 follows, and if the invitation is declined, then operation 427 follows. In operation 425, the invitation is displayed as accepted and thus the event appears as other accepted events appear on the user's calendar. Optionally, the event which constitutes the invitation is also removed from the invitation calendar or is shown as accepted on the invitation calendar. In operation 427, if the operation is declined, then it is removed from the user's calendar and optionally shown as declined on the invitation calendar. In another embodiment, the declined event may also be removed from the invitation calendar in addition to removing it from the user's calendar.

Figure 5A:
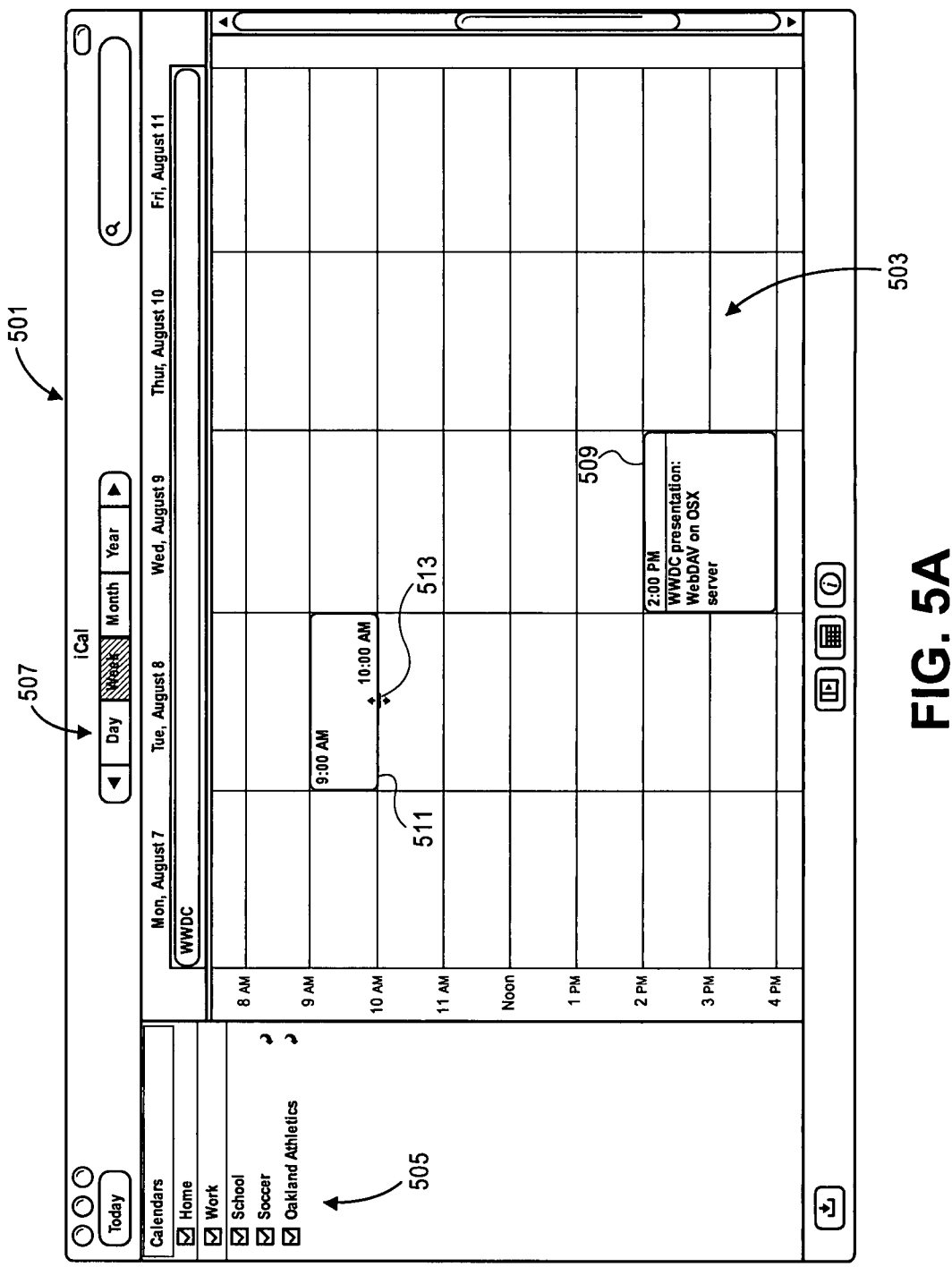
FIGS. 5A, 5B, 5C, 5D, 5E, and 5F illustrate exemplary user interfaces for creating an event or invitation.
Figure 5B:
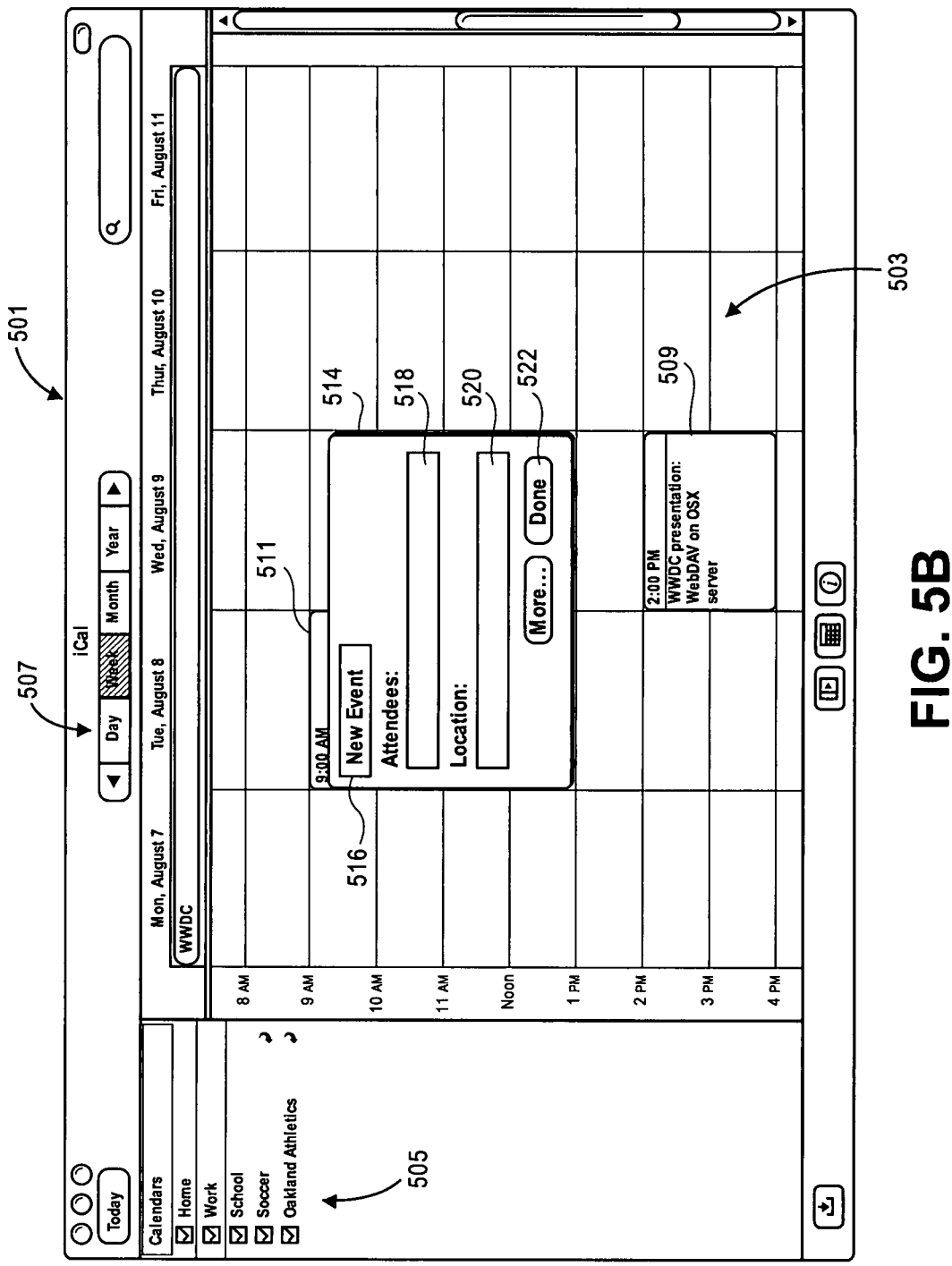
Figure 5C:
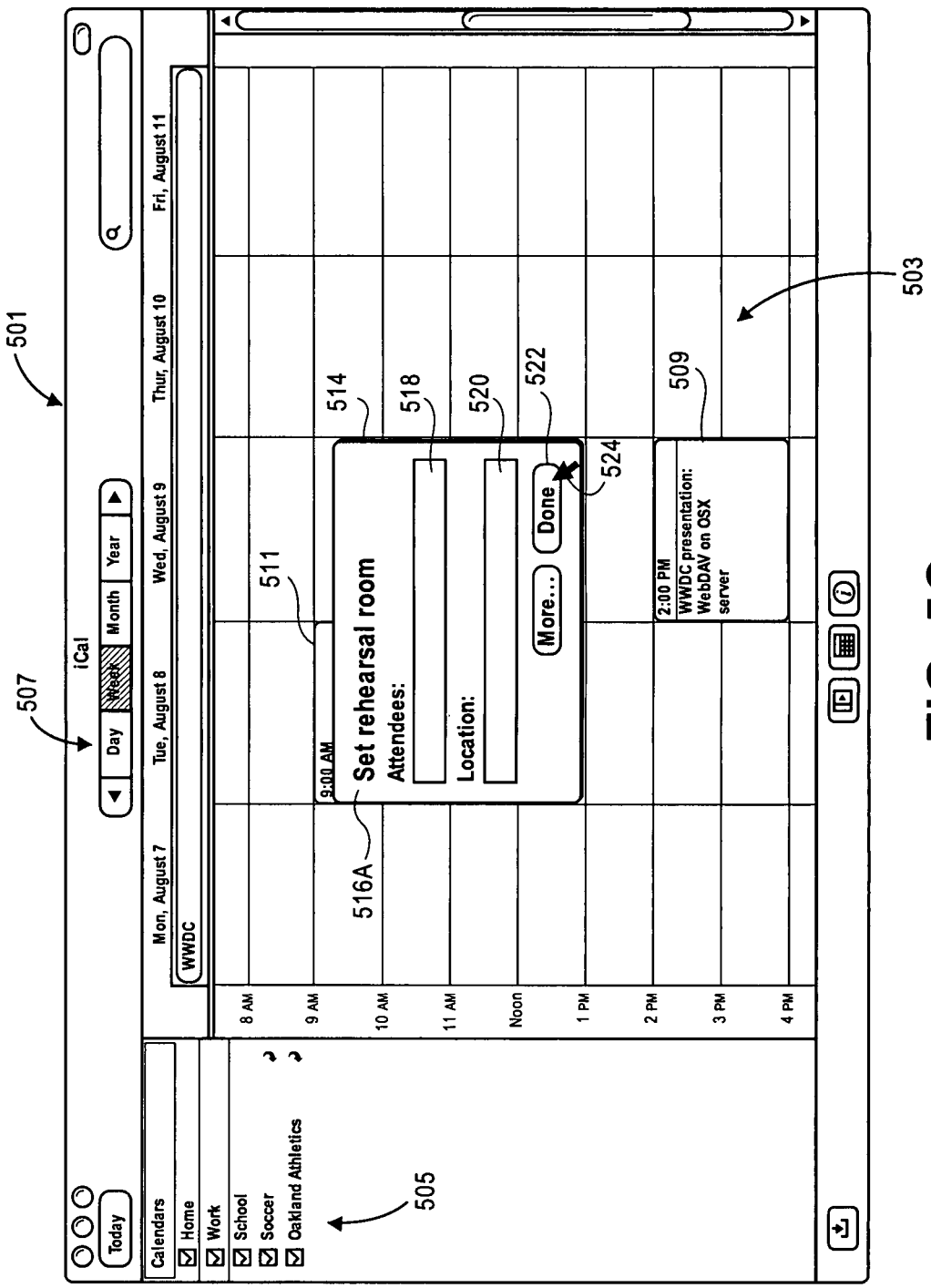

Additional examples of embodiments of user interfaces will now be provided by FIGS. 5A-5F and FIGS. 6A-6C. FIGS. 5A-5F show examples of how events are created within a calendar and how invitations may be created from the sender's side of an invitation. FIG. 5A shows an example of a calendar application window 501 which includes a view 503 of a user's calendar. This view may be selected to be at one of a plurality of different time ranges, such as a day range or a week range or a month range or a year range, as determined by the range selector 507. In the particular example shown in FIG. 5A, an input has been received which instructed the system to display events within a week range in the view 503. The calendar application window 501 also includes a list 505 of selectable calendars, which in this case have all been selected for having their events displayed within the view 503. The view 503 includes an event 509, which has already been scheduled, and an event 511, which is currently being scheduled as shown in the example of FIG. 5A. The cursor 513 is being used to select the duration of the event 511 as shown in FIG. 5A. After the duration has been selected, a dialog window 514 is displayed as shown in FIG. 5B, allowing user input into three fields 516, 518, and 520. The field 516 of FIG. 5B allows the user or the system to enter text which represents the name of the event or other information. The field 518 allows the user or the system to enter attendees; in certain embodiments, the user or the system may merely enter the first part of an attendee's name and the system will search through contact databases or address databases for that person's name and may include contact information, such as an email address or a phone number or other contact information which can be used to alert the attendees of the events/invitation as shown below. In the case of the example shown in FIGS. 5B and 5C, there will be no attendees, and thus the field 518 remains blank in both FIGS. 5C and 5B. Similarly, the location field 520 also remains blank. After the user has entered text into field 516 as shown in FIG. 5C, the user can then complete the entry of data for the event 511 by selecting the "done" button 522 by positioning a cursor 524 over the done button; in other embodiments, other inputs may be used to indicate that the user has completed entry of information with respect to an event. For example, the user may press a key, or button, such as a return button on a keyboard.

Figure 5D:
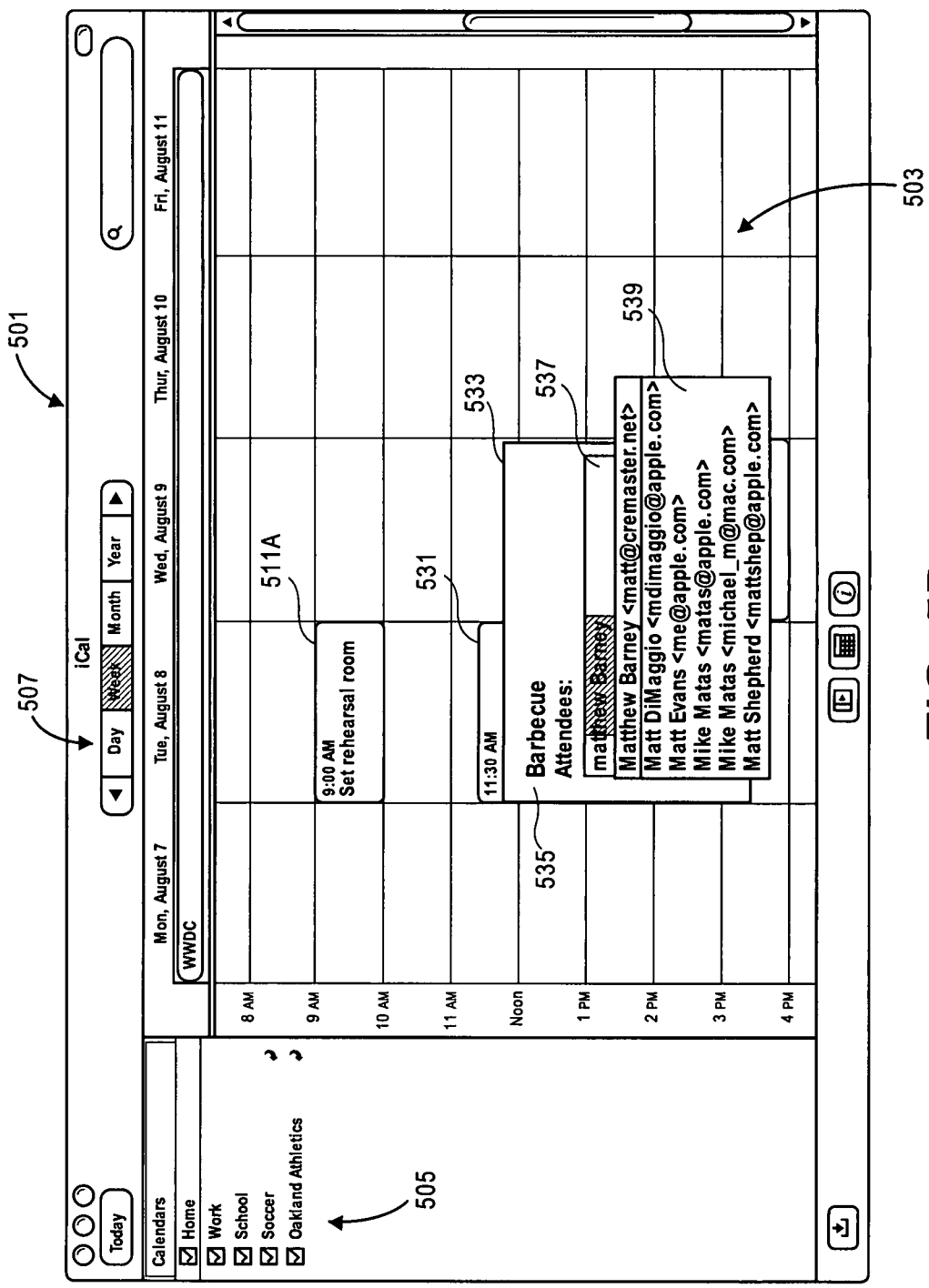
Figure 5E:
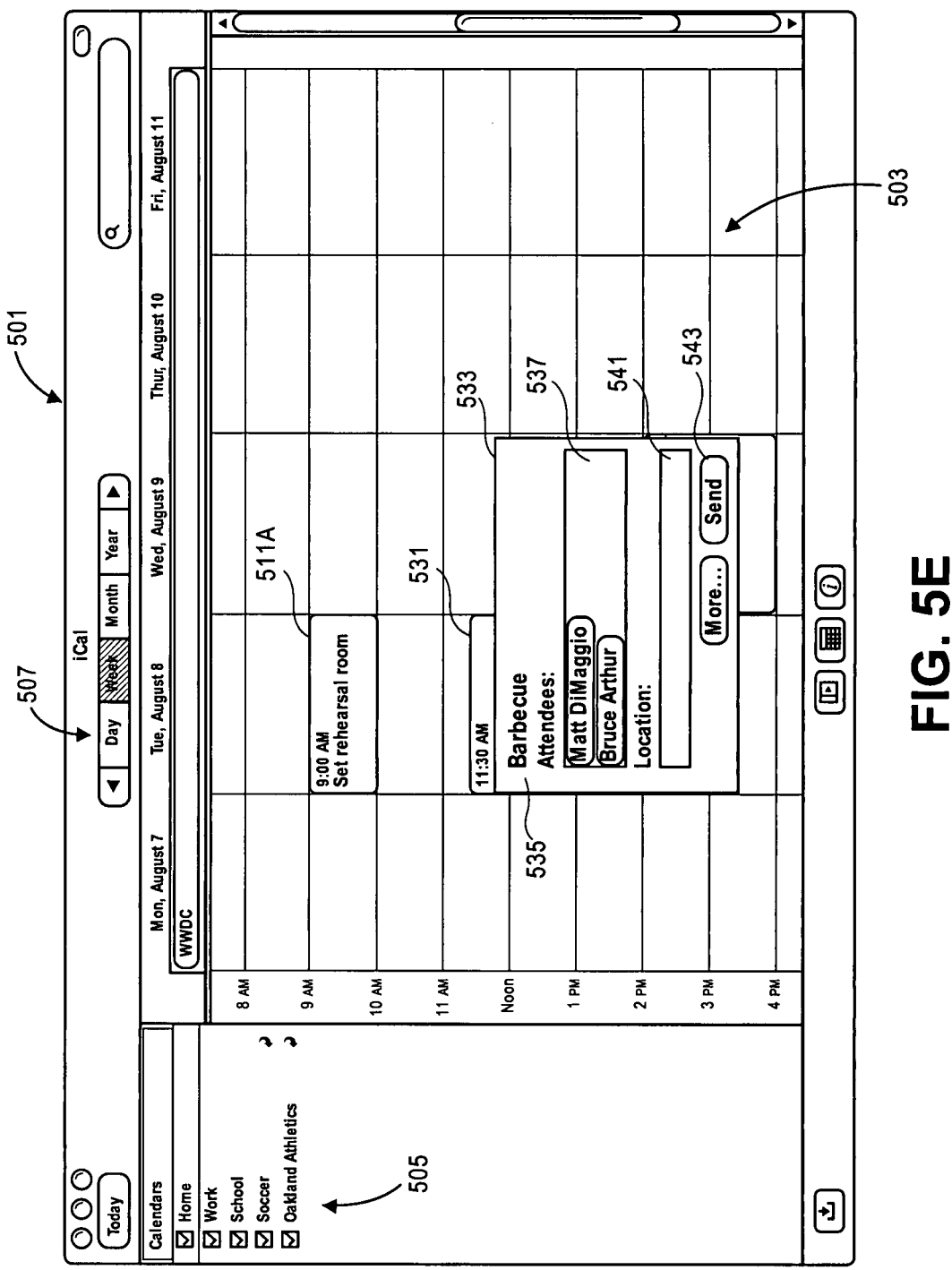
Figure 5F:
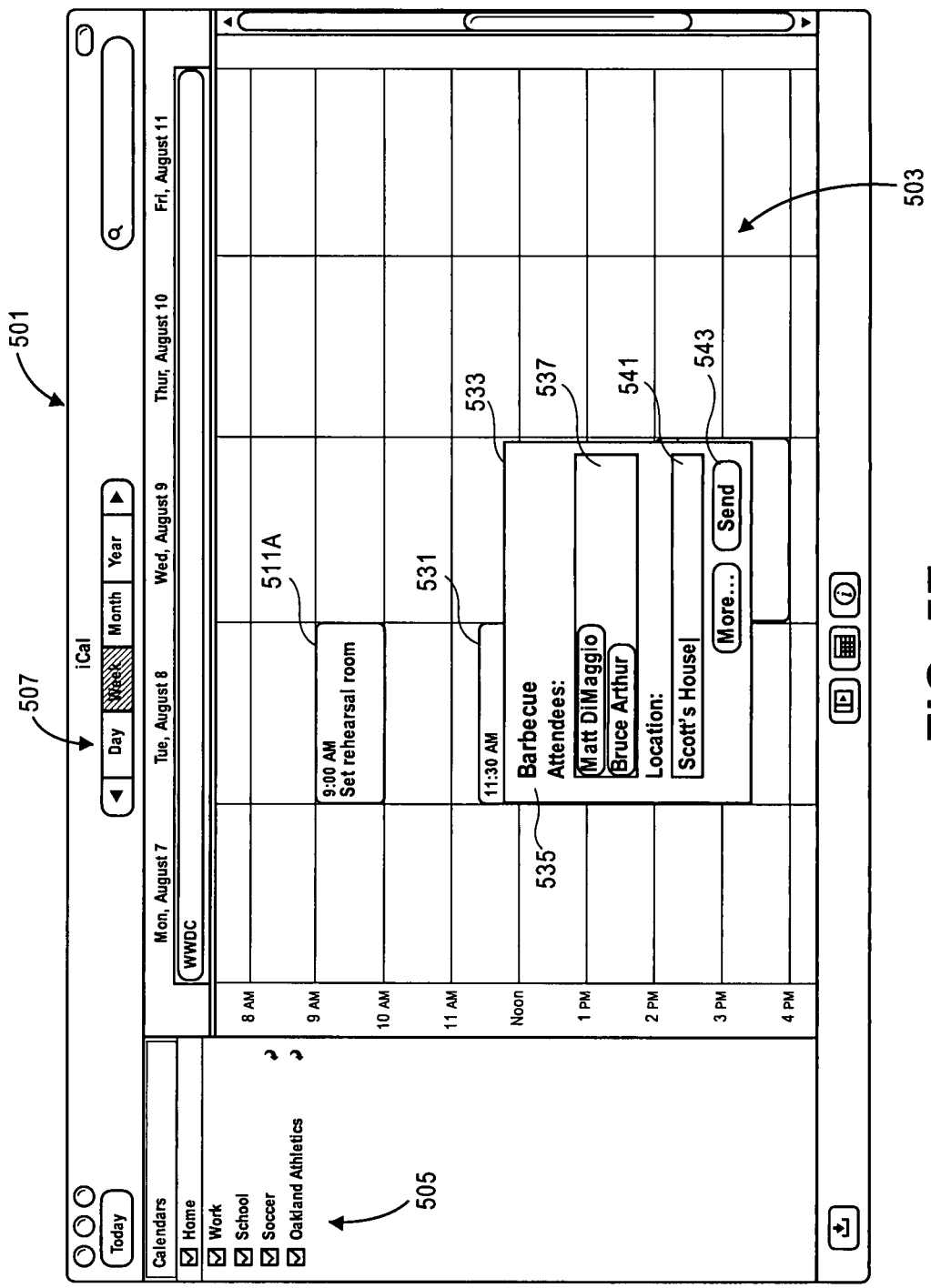

FIGS. 5D, 5E, and 5F show an example of user interfaces for creating an event and an invitation at the sender's side of the invitation. The sequence of user interfaces shown in FIGS. 5D, 5E, and 5F follow the sequence of user interfaces shown in FIGS. 5A, 5B, and 5C. Hence, the event 511 has turned into event 511A, as shown in FIG. 5D, because the user has completed entry of information in connection with that event which now appears in the view 503. The user, as shown in FIG. 5D, has begun creating a new event 531 which will also become an invitation because the event has two attendees. As shown in FIG. 5D, the user has entered a name for the event/invitation in a field 535 within the window 533 which accepts input for the event/invitation. The user has also entered a portion of one of the attendees' names within the field 537 which specifies the attendees. In response, the system returns a list of names which match the text entered into field 537. In particular, the system returns a list 539 from which the user can select one or more names for entry into the field 537. In the particular example shown in FIG. 5D, the attendees are specified by name and by email address and notifications about the invitation will be sent to the attendees by email. In alternative embodiments, other messaging techniques, such as telephone contacts, instant messaging addresses or contacts, etc. may be alternatively used or used in addition to email addresses. After a selection of the attendees as shown in FIG. 5D, the window 533 is ready to receive a location input into field 541 as shown in FIG. 5E. The user or the system then enters a location in the field 541 as shown in FIG. 5F and at this point the invitation is ready to be sent, and the event's data entry will be completed after the user selects the "send" button 543 as shown in FIG. 5F. Selecting that button will then cause the event to be displayed as event 531 on the sender's calendar and will also cause a notification, in this case by email, to be sent to the two attendees listed in field 537. In the embodiment discussed relative to FIGS. 6A-6C on the attendee's side, these emails are used to provide a notification from an email program to the calendaring program at the attendee's side so that the notification can be received directly within the calendaring window rather than merely in an email application window.

Figure 6A:
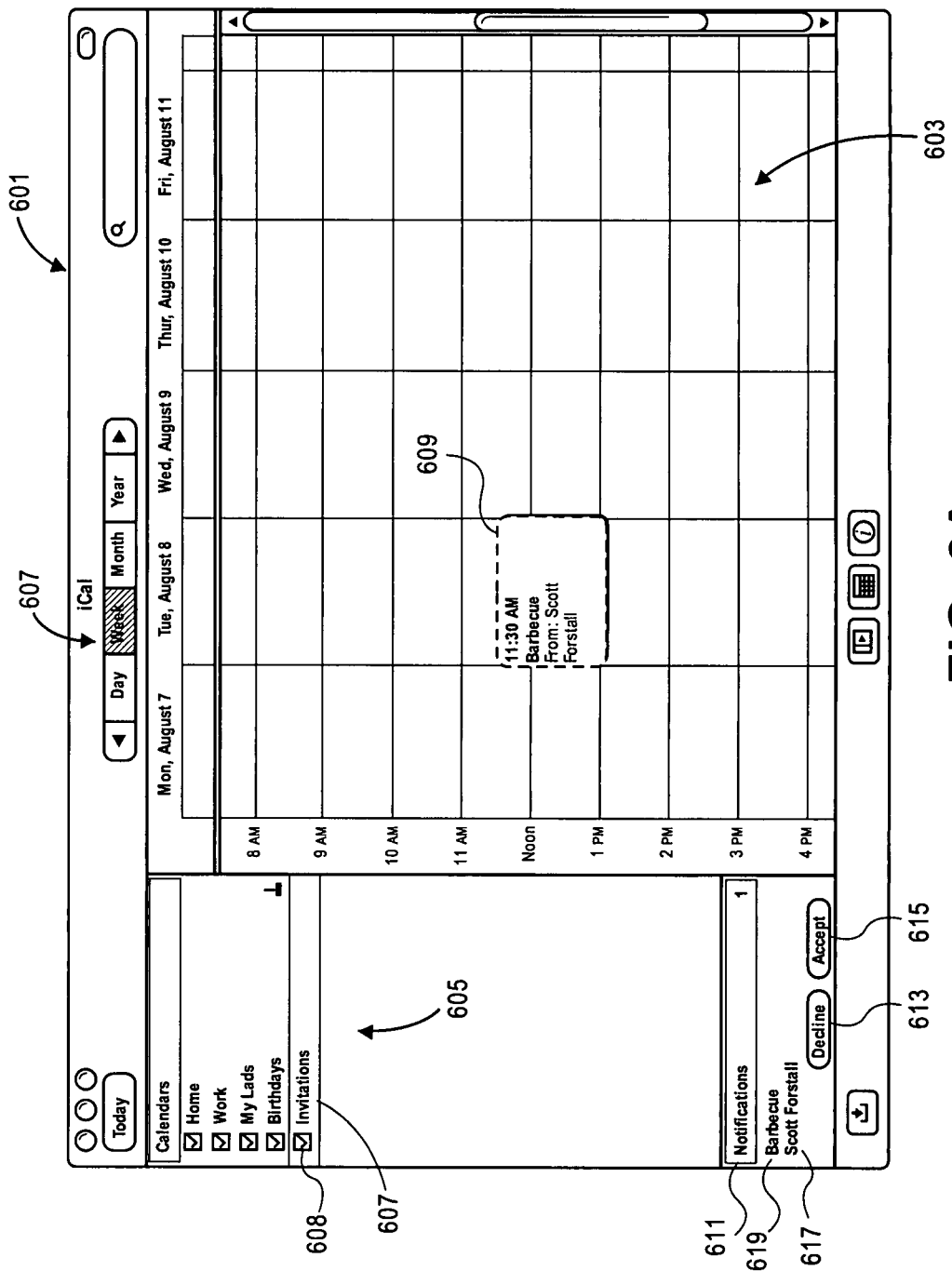
FIGS. 6A, 6B, and 6C illustrate exemplary user interfaces showing how invitations may be received and displayed within a user's calendar even before the invitation is accepted.
Figure 6B:
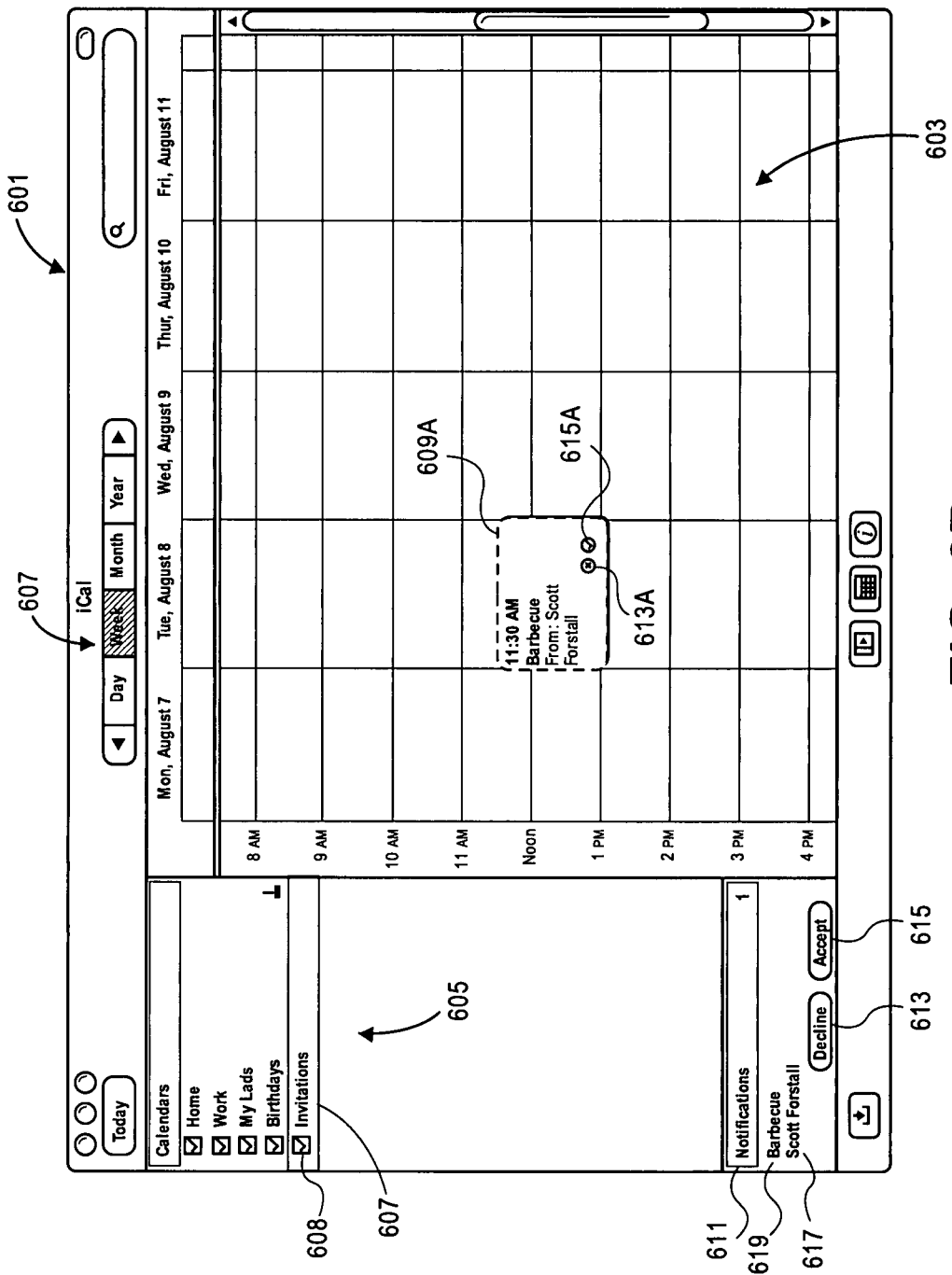
Figure 6C:
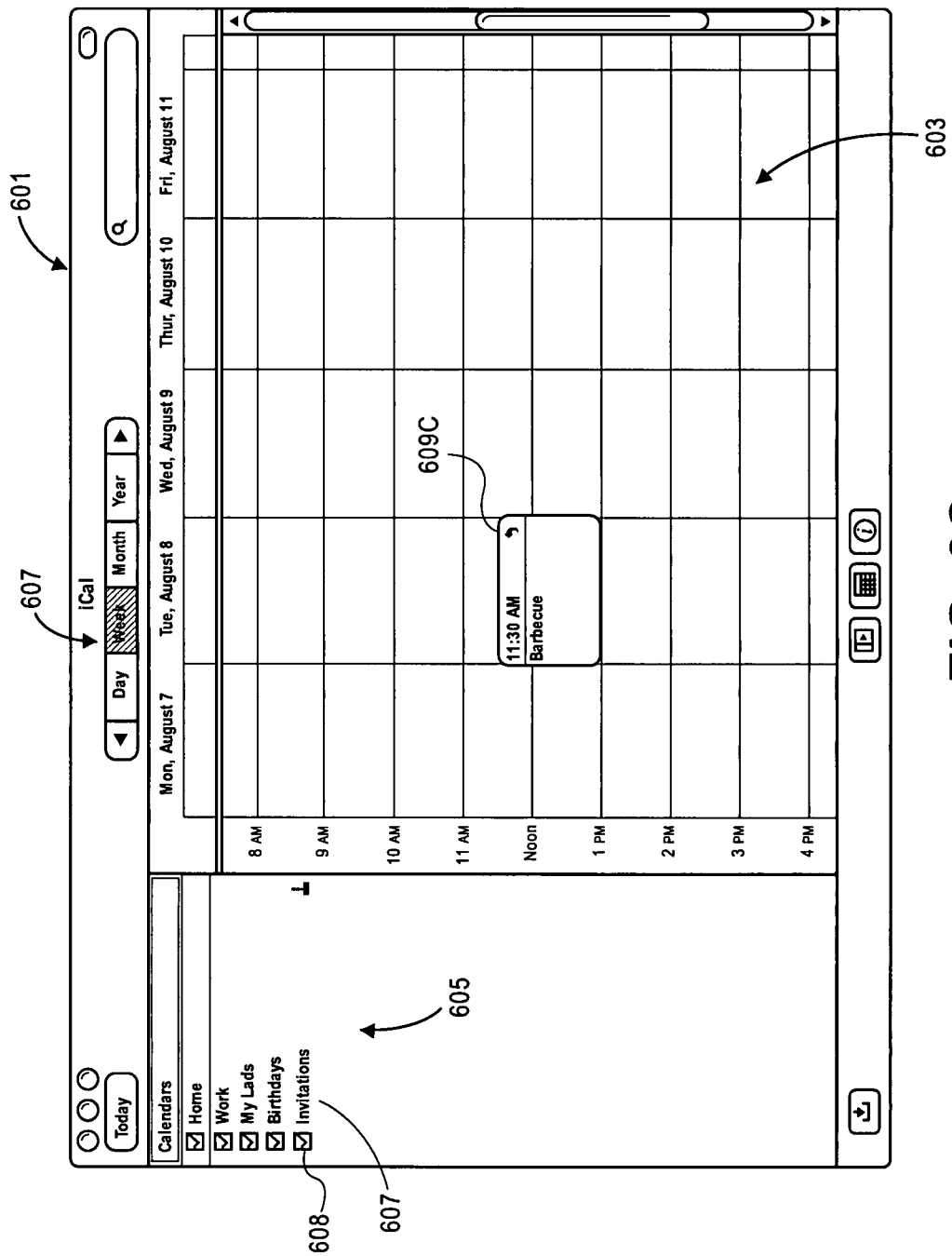

FIGS. 6A, 6B, and 6C illustrate the receipt of the invitation at the attendee's side of an invitation. In this particular example, the invitation created and sent from FIGS. 5D, 5E, and 5F is received at the attendee's side as shown in FIGS. 6A, 6B, and 6C. The attendee is using a data processing system which displays a calendar application window 601 which includes a view 603 showing a week time range in the view 603 as determined by the interface control 607 in which the week time range is selected. The calendar application window 601 also includes a list of selectable calendars which includes an invitation calendar 607 shown in the list 605. As can be seen from FIG. 6A, all of the calendars have been selected to show their events within the view 603. For example, the invitations calendar 607 has been selected to show its events, which in this case are unaccepted invitations as shown by the selection command 608, which includes a check mark in the selection command 608. The calendar application window 601 also shows the invitation 609 and a notification 611 within the window. The invitation 609 is shown in the view 603 in a form to indicate that it has not yet been accepted or declined. In the example shown in FIGS. 6A and 6B, this form includes a coupon-like perimeter which includes a dotted or dashed line. Further, the invitation is shown without any of the colors used to indicate other events for other calendars. For example, all events from the home calendar may be shown in red while events from the work calendar may be shown in green, etc. As noted above, other types of indicators may alternatively be used or used in addition to those mentioned to show that the event is an invitation which has not yet been accepted. The notification 611 results from the email sent from the sender's system as a result of selecting the send button 543 shown in FIG. 5F. Alternatively, the notification could arrive from an instant messaging message or other electronic messages or even an automated phone system caused to make a phone call by selecting the send button 543 which, in turn, is received automatically by a recipient's data processing system which in turn converts this into a notification, such as notification 611. Information within the notification 611 includes the name of the event 619 and the sender of the event or invitation 617. In addition, the invitation includes an "accept" icon 615 which may be used to accept the invitation, and a "decline" icon 613 which may be used to decline the invitation. FIG. 6B shows an alternative embodiment in which accept and decline icons also appear within the invitation itself on the calendar, such as within the view 603 as shown in FIG. 6B. In particular, a decline icon 613A and an accept icon 615A are shown within the invitation 609A as shown in the view 603. The user can accept the invitation by selecting either icon 615 or 615A shown in FIG. 6B, and can decline the invitation by selecting either icon 613 or 613A. Accepting the invitation causes the invitation to be removed, in at least certain embodiments, from the invitation calendar 607, and causes the event to be displayed as a normal event rather than an invitation as shown in FIG. 6C, in which the event 609C now becomes an event within the home calendar and assumes the color of events (e.g. red) of events within the home calendar.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable non-transitory storage medium containing executable program instructions which cause a data processing system to perform operations comprising:
    displaying a calendar view which includes a list of user-selectable calendars on a display device, the calendar view being configured with at least one area corresponding to a time range;
    displaying, within the calendar view, an invitation calendar control to control the visibility of an invitation calendar that displays all invitations within the calendar view prior to accepting or declining the invitations and separately controllable from any other user-selectable calendars in the list of user-selectable calendars;
    receiving a notification having an invitation for an event within the time range; and
    displaying the invitation, before it is accepted or declined, within the invitation calendar on the area of the calendar view in response to a user input selecting the invitation calendar control, wherein the notification is indicated on the display device to invite a user to select the invitation calendar control if the invitation is not visible within the calendar view, and
    wherein the invitation, if accepted, will display within a different user-selectable calendar of the list of user-selectable calendars.

2. A medium as in claim 1 wherein the at least one time range comprises one of at least a portion of a day, a week, a plurality of weeks, a month, and a plurality of months, and wherein the operations further comprise:
    receiving a user input, via the invitation calendar control, to display the invitation within the invitation calendar, before it is accepted or declined, on the calendar view along with other events, already accepted, and displayed in association with other calendars of the list of user-selectable calendars on the calendar view.

3. A medium as in claim 1, wherein the notification is automatically converted for the display of the invitation on the calendar view.

4. A medium as in claim 1, the operations further comprising:
displaying a user interface to allow a user to accept or decline the invitation.

5. A medium as in claim 4 wherein the user interface comprises an accept icon and a decline icon displayed on the invitation on the calendar view.

6. A medium as in claim 4 wherein the operations further comprise displaying the invitation in a first state within the invitation calendar on the calendar view before accepting or declining the invitation; and wherein accepting the invitation causes the invitation to be displayed on the calendar view associated with a different user-selectable calendar and in a second state to show it is accepted.

7. A medium as in claim 4 wherein the invitation is presented differently on the calendar view than other events, already accepted, on the calendar view.

8. A medium as in claim 7 wherein the invitation is visually distinguishable from the other events and the time span of the invitation is shown on the calendar view in the same manner as the time spans of the other events which are shown on the calendar view and wherein accepting the invitation causes an acceptance message to be sent to a source of the invitation.

9. The medium as in claim 1, wherein the operations further comprise removing the invitation from the area of the calendar view in response to a second user input un-selecting the invitation calendar control to not visible, wherein the invitation remains not accepted or declined.

10. The medium as in claim 1, wherein the displaying the invitation includes displaying multiple invitations,
wherein the invitation visibility input controls the visibility of the multiple invitations without accepting or declining the invitations, and
wherein the multiple invitations, if accepted, become associated with one or more other calendars in the list of user-selectable calendars.

11. A machine implemented method comprising:
displaying a calendar view on a display device, the calendar view being configured with at least one area corresponding to a time range and displaying at least one calendar from a list of user-selectable calendars;
receiving a notification having an invitation for an event of the time range;
receiving user commands to set an invitation calendar control to control the visibility of an invitation calendar that displays all invitations prior to accepting or declining the invitations, wherein each of the one or more invitations has not been accepted or declined and wherein the one or more invitations include the invitation in the notification;
displaying the invitation, before it is accepted or declined, on the area of the calendar view, if the invitation calendar control is set to visible by a first user command; and
wherein the invitation calendar is separately controllable from any other user-selectable calendars and controls the visibility of all invitations recited by the machine.

12. A method as in claim 11 wherein the at least one time range comprises one of at least a portion of a day, a week, a plurality of weeks, a month, and a plurality of months, and wherein the method further comprises:

receiving a user command to display the invitation within the invitation calendar, before it is accepted or declined, on the calendar view along with other events, already accepted and displayed in association with other calendars of the list of user-selectable calendars, on the calendar view.

13. A method as in claim 11, wherein the notification is automatically converted for the display of the invitation on the calendar view.

14. A method as in claim 11, the method further comprising:
displaying a user interface to allow a user to accept or decline the invitation.

15. A method as in claim 14 wherein the user interface comprises an accept icon and a decline icon displayed on the invitation on the calendar view.

16. A method as in claim 14 wherein the method further comprises accepting the invitation causes the invitation to be removed from the invitation calendar and causes the invitation to be displayed on the calendar view associated with a different user-selectable calendar and in a form to show it is accepted.

17. A method as in claim 14 wherein the invitation is presented differently on the calendar view than other events, already accepted, on the calendar view.

18. A method as in claim 17 wherein the invitation is visually distinguishable from the other events and the time span of the invitation is shown on the calendar view in the same manner as the time spans of the other events which are shown on the calendar view and wherein accepting the invitation causes an acceptance message to be sent to a source of the invitation.

19. The machine implemented method of claim 11, further comprising removing the invitation from the area of the calendar view in response to receiving a second user command input un-selecting the invitation calendar control to not visible, wherein the invitation remains not accepted or declined.

20. A data processing system comprising:
means for displaying a calendar view on a display device, the calendar view being configured with at least one area corresponding to a time range and displaying at least one calendar from a list of user-selectable calendars;
means for receiving a notification having an invitation for an event of the time range;
means for receiving commands to set an invitation calendar control to control the visibility of an invitation calendar that displays all invitations received by the data processing system prior to accepting or declining the invitations, wherein each of the one or more invitations has not been accepted or declined and wherein the one or more invitations include the invitation in the notification;
means for displaying the invitation, before it is accepted or declined, on the area of the calendar view, if the invitation calendar control is set to visible by a first user command; and
means for removing the invitation, if accepted or declined, from the invitation calendar and, if accepted, displaying the event associated with the invitation in a different calendar of the user-selectable calendars.

21. The data processing system of claim 20, further comprising means for removing the invitation from the area of the calendar view in response to receiving a second user command input un-selecting the invitation calendar control, wherein the invitation remains not accepted or declined.

22. A machine readable non-transitory storage medium containing executable program instructions which cause a data processing system to perform operations comprising:

displaying a calendar view on a display device, the calendar view having at least one time range;

displaying a list of user-selectable calendars comprising an invitation calendar wherein each invitation received by the data processing system is included in the invitation calendar until the invitations are accepted or declined, the invitation calendar containing no accepted events or declined events;

in response to receiving a message having an invitation for an event, updating the invitation calendar with the event before the invitation is accepted or rejected;

displaying the invitation on the calendar view, if the invitation calendar is selected from the list of user-selectable calendars, before the invitation is accepted or rejected receiving an acceptance of the invitation; and in response to the receiving of the acceptance, removing automatically the invitation from the invitation calendar.

23. A medium as in claim 22 wherein the operations further comprise:

displaying, for each user-selectable calendar in the list, a user interface to cause events from a corresponding calendar to be displayed or not displayed on the calendar view, and wherein the at least one range comprises one of at least a portion of a day, a week, a plurality of weeks, a month, and a plurality of months.

24. A medium as in claim 23 wherein when the user interface for the invitation calendar is set to cause invitations from the invitation calendar to be displayed, then the invitations are displayed on the calendar before the invitation is accepted, and when the user interface for the invitation calendar is set to cause invitations from the invitation calendar to be not displayed, then the invitations are not displayed.

25. A medium as in claim 24 wherein the method further comprises:

displaying an alert associated with the invitation.

26. A medium as in claim 25 wherein the operations further comprise:

displaying a user interface to allow a user to accept the invitation.

27. A medium as in claim 26 wherein invitations, when displayed on the calendar view before being accepted, are visually distinguishable from events from other calendars in the list of user-selectable calendars.

28. A medium as in claim 27 wherein the user interface for each selectable calendar is selectable independently of the other user interfaces for other calendars in the list.

29. A machine implemented method comprising:

displaying a calendar view on a display device, the calendar view having at least one time range;

displaying a list of user-selectable calendars with the calendar view, the user-selectable calendars comprising an invitation calendar wherein each invitation received by the data processing system is included in the invitation calendar until the invitations are accepted or declined, the invitation calendar containing no accepted events or declined events;

in response to receiving a message having an invitation for an event, updating the invitation calendar with the event before the invitation is accepted or rejected;

displaying the invitation on the calendar view, if the invitation calendar is selected from the list of user-selectable calendars, before the invitation is accepted or rejected receiving an acceptance of the invitation; and in response to the receiving of the acceptance, removing automatically the invitation from the invitation calendar.

30. A method as in claim 29 wherein the method further comprises:

displaying, for each user-selectable calendar in the list, a user interface to cause events from a corresponding calendar to be displayed or not displayed on the calendar view, and wherein the at least one range comprises one of at least a portion of a day, a week, a plurality of weeks, a month, and a plurality of months.

31. A method as in claim 30 wherein when the user interface for the invitation calendar is set to cause invitations from the invitation calendar to be displayed, then the invitations are displayed on the calendar view before an invitation is accepted, and when the user interface for the invitation calendar is set to cause invitations from the invitation calendar to be not displayed, then the invitations are not displayed.

32. A method as in claim 31 wherein the method further comprises:

displaying an alert associated with the invitation.

33. A method as in claim 32 wherein the method further comprises:

displaying a user interface to allow a user to accept the invitation.

34. A method as in claim 33 wherein invitations, when displayed on the calendar view before being accepted, are visually distinguishable from events from other calendars in the list of user-selectable calendars.

35. A method as in claim 34 wherein the user interface for each selectable calendar is selectable independently of the other user interfaces for other calendars in the list.

36. A data processing system comprising:

means for displaying a calendar view on a display device, the calendar view having at least one time range;

means for displaying a list of user-selectable calendars comprising an invitation calendar wherein each invitation received by the data processing system is included in the invitation calendar until the invitations are accepted or declined, the invitation calendar contains no accepted events or declined events;

in response to receiving a message having an invitation for an event, means for updating the invitation calendar with the event before the invitation is accepted or rejected;

means for displaying the invitation on the calendar view, if the invitation calendar is selected from the list of user-selectable calendars, before the invitation is accepted or rejected means for receiving an acceptance of the invitation; and in response to the receiving of the acceptance, means for removing automatically the invitation from the invitation calendar.

37. A machine readable non-transitory storage medium containing executable program instructions which cause a data processing system to perform a method comprising:

displaying a user's calendar view on a display device;

displaying a list of calendars comprising an invitation calendar, each of the calendars in the list having at least one time range, wherein each invitation received by the data processing system is included in the invitation calendar until the invitations are accepted or declined, the invitation calendar containing only invitations representing unaccepted or un-declined events;

displaying a selection interface for each calendar in the list of calendars, each of the selection interfaces to cause events from a corresponding calendar to be displayed or not displayed on the user's calendar view;

in response to receiving a message having an invitation for an event, updating the invitation calendar with the event before the invitation is accepted or rejected;

displaying the invitation on the user's calendar view, if the invitation calendar is selected from the list of calendars, before the invitation is accepted or declined;

receiving an acceptance of the invitation; and in response to the receiving of the acceptance, removing automatically the event associated with the invitation from the invitation calendar.

38. A medium as in claim 37 wherein each selection interface is a toggle for a corresponding calendar, and wherein a calendar's events are displayed in the user's calendar view when its toggle is activated and wherein more than one calendar in the list of calendars can be toggled to an activated state and wherein events contained in all toggled on calendars are displayed concurrently with the user's calendar view.

39. A medium as in claim 38 wherein invitations from the invitations calendar, when toggled on, are displayed with the user's calendar view before the invitations are accepted by the user.

40. A medium as in claim 39 wherein deactivating an activated toggle for a first calendar causes events from the first calendar to be removed from the display of the user's calendar view.

41. A medium as in claim 40 wherein the method further comprises:

displaying an alert associated with the invitation.

42. A medium as in claim 41 wherein the method further comprises:

displaying a user interface to allow a user to accept the invitation.

43. A medium as in claim 42 wherein invitations, when displayed on the user's calendar view before being accepted, are visually distinguishable from events from other calendars in the list of calendars.

44. A machine implemented method comprising:

displaying a user's calendar view on a display device;

displaying a list of calendars comprising an invitation calendar, each of the calendars in the list having at least one time range, wherein each invitation received by the data processing system is included in the invitation calendar until the invitations are accepted or declined, the invitation calendar displaying only invitations representing unaccepted or un-declined events;

displaying a selection interface for each calendar in the list of calendars, each of the selection interfaces to cause events from a corresponding calendar to be displayed or not displayed on the user's calendar view;

in response to receiving a message having an invitation for an event, updating the invitation calendar with the invitation before the invitation is accepted or rejected;

displaying the invitation on the user's calendar view, if the invitation calendar is selected from the list of calendars, before the invitation is accepted or declined;

receiving an acceptance of the invitation; and in response to the receiving of the acceptance, removing automatically the invitation from the invitation calendar.

45. A method as in claim 44 wherein each selection interface is a toggle for a corresponding calendar, and wherein a calendar's events are displayed in the user's calendar view when its toggle is activated and wherein more than one calendar in the list of calendars can be toggled to an activated state and wherein events contained in all toggled on calendars are displayed concurrently in the user's calendar view.

46. A method as in claim 45 wherein invitations from the invitations calendar, when toggled on, are displayed in the user's calendar view before the invitations are accepted by the user.

47. A method as in claim 46 wherein deactivating an activated toggle for a first calendar causes events from the first calendar to be removed from the display of the user's calendar view.

48. A method as in claim 47 wherein the method further comprises:

displaying an alert associated with the invitation.

49. A method as in claim 48 wherein the method further comprises:

displaying a user interface to allow a user to accept the invitation.

50. A method as in claim 49 wherein invitations, when displayed on the user's calendar view before being accepted, are visually distinguishable from events from other calendars in the list of calendars.

51. A data processing system comprising:

means for displaying a user's calendar view on a display device;

means for displaying a list of calendars comprising an invitation calendar, each of the calendars in the list having at least one time range, wherein each invitation received by the data processing system is included in the invitation calendar until the invitations are accepted or declined, the invitation calendar controls display of no accepted events or declined events;

means for displaying a selection interface for each calendar in the list of calendars, each of the selection interfaces to cause events from a corresponding calendar to be displayed or not displayed on the user's calendar view;

in response to receiving a message having an invitation for an event, means for updating the invitation calendar with the invitation before the invitation is accepted or rejected;

means for displaying the invitation on the user's calendar view, if the invitation calendar is selected from the list of calendars, before the invitation is accepted or declined;

means for receiving an acceptance of the invitation; and in response to the receiving of the acceptance, means for removing automatically the invitation from the invitation calendar.

* * * * *